United States Patent [19]
Tanikoshi

[11] 3,936,710
[45] Feb. 3, 1976

[54] SYNCHRONOUS DRIVE CONTROL SYSTEM FOR DC MOTOR

[75] Inventor: Kinji Tanikoshi, Kawasaki, Japan

[73] Assignee: Canon Kabushiki Kaisha, Tokyo, Japan

[22] Filed: June 5, 1974

[21] Appl. No.: 476,662

[30] Foreign Application Priority Data
June 4, 1973 Japan.............................. 48-65614
June 11, 1973 Japan.............................. 48-65615
June 11, 1973 Japan.............................. 48-78587

[52] U.S. Cl................................. 318/318; 318/341
[51] Int. Cl.²......................................... H02P 5/00
[58] Field of Search..................... 318/314, 318, 341

[56] References Cited
UNITED STATES PATENTS

| | | | |
|---|---|---|---|
| 3,110,853 | 11/1963 | Jones............................ | 318/318 X |
| 3,154,730 | 10/1964 | Houldin et al.................. | 318/318 X |
| 3,207,970 | 9/1965 | Branco........................... | 318/318 X |
| 3,478,178 | 11/1969 | Grace............................. | 318/318 X |
| 3,553,555 | 1/1971 | Morris et al.................... | 318/318 X |
| 3,582,550 | 6/1971 | Latanzi.......................... | 318/318 X |

*Primary Examiner*—Gene Z. Rubinson
*Attorney, Agent, or Firm*—Fitzpatrick, Cella, Harper & Scinto

[57] ABSTRACT

A system is provided to synchronously operate a DC motor in response to the frequency of a reference signal. The system includes a first feedback loop having a reference signal generator, a speed signal generator in relation to speed of the motor, and a flip-flop circuit for producing a rectangular wave pulse for supplying to the DC motor current corresponding to a phase difference between two signals from these generators. The system further includes a second feedback loop for speed control having a forced synchronization circuit which processes the output of the speed signal generator and brings the motor speed into a synchronization condition in order to prevent the motor from erroneously synchronizing.

19 Claims, 40 Drawing Figures

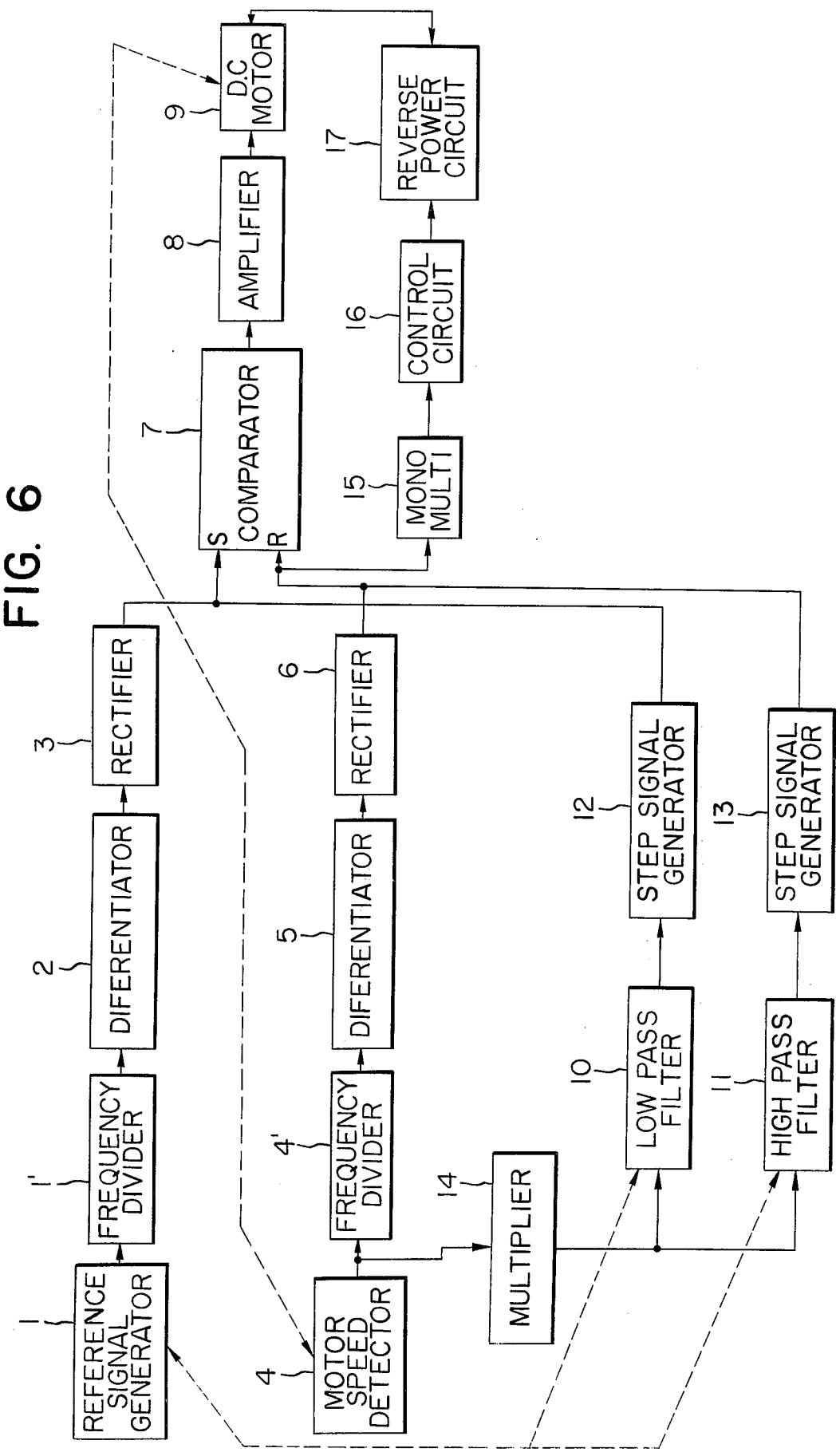

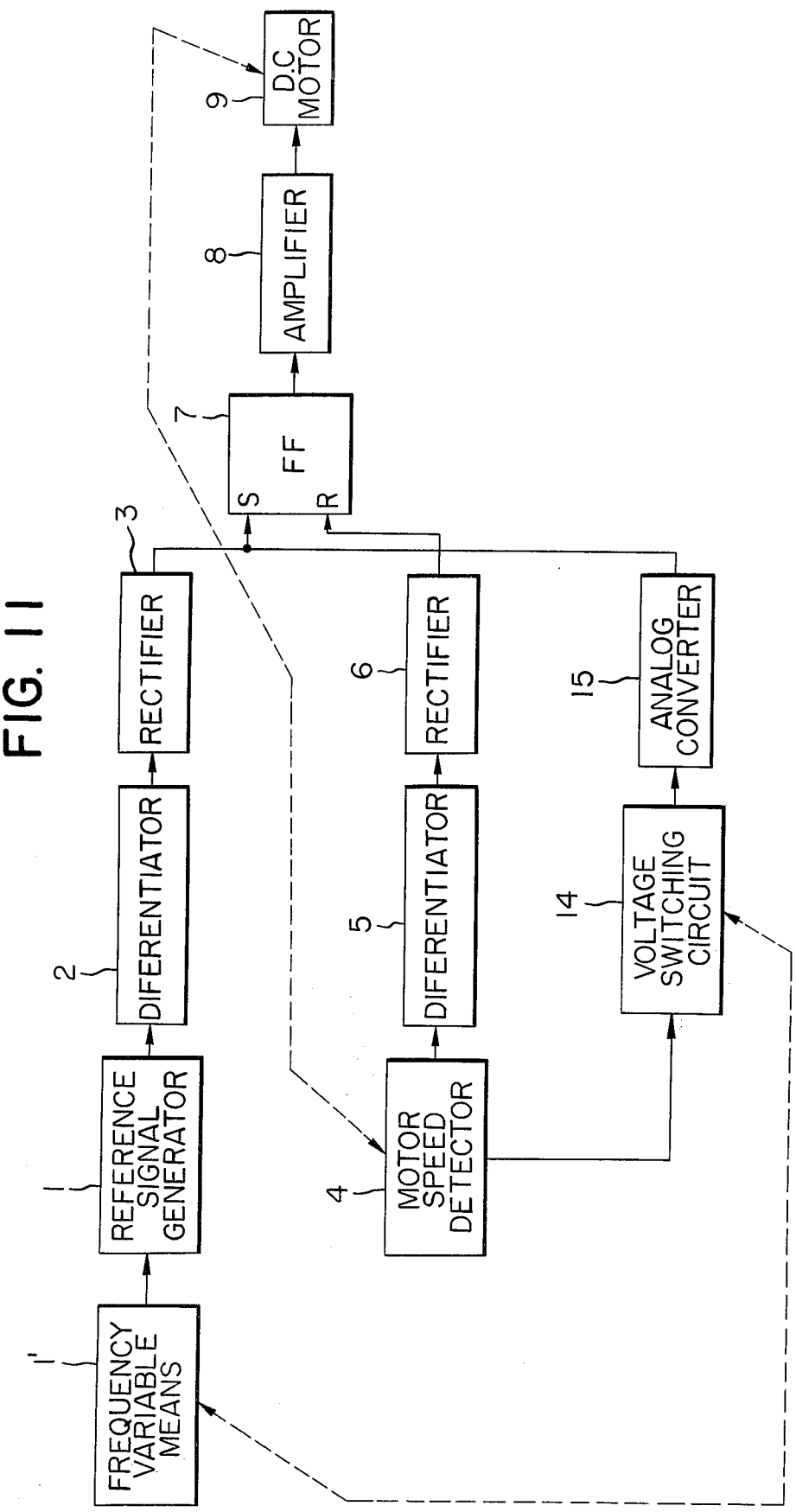

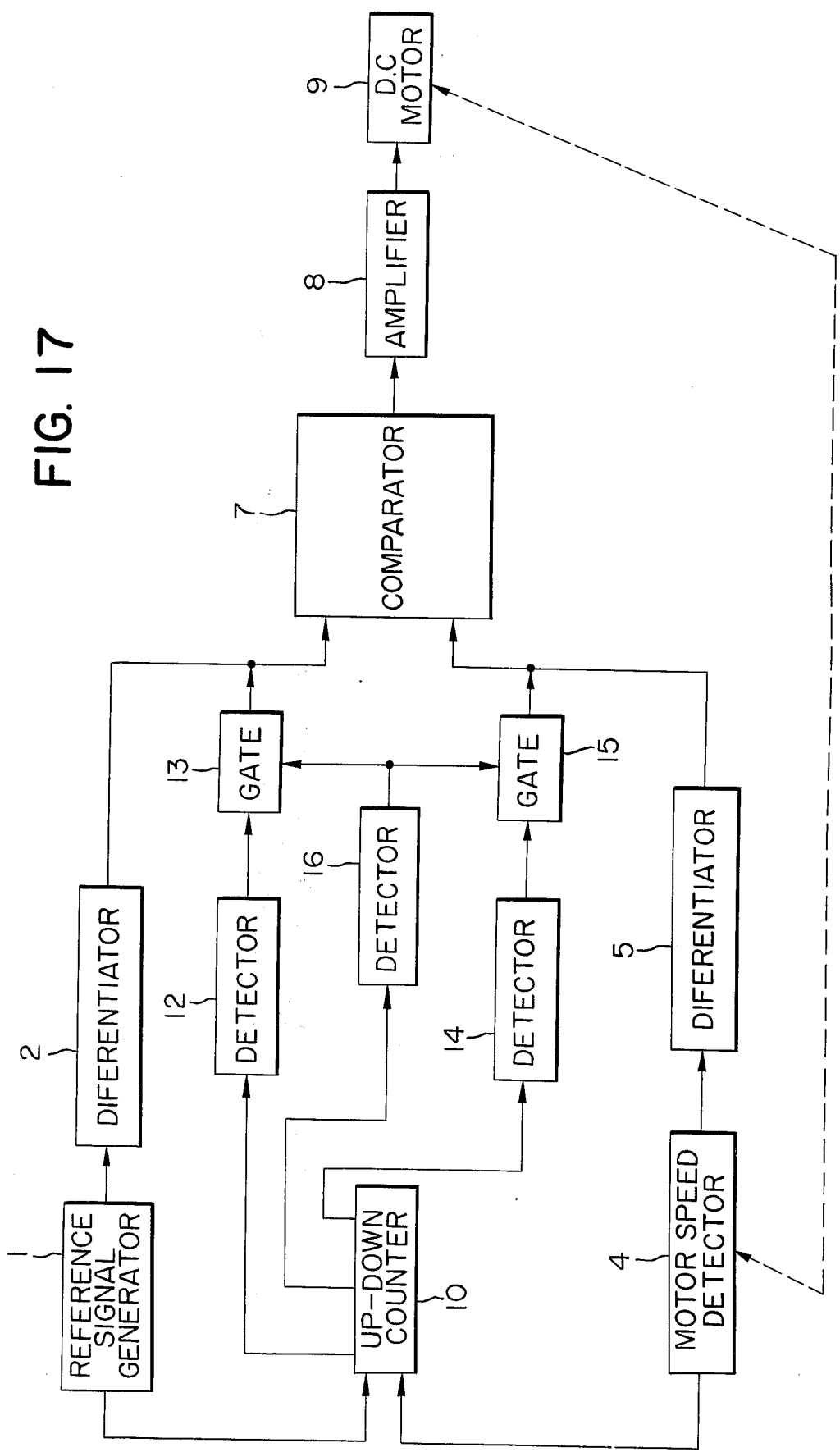

SYNCHRONOUS DRIVE CONTROL SYSTEM FOR DC MOTOR

BACKGROUND OF THE INVENTION

1. Field of the Invention

This invention relates to a control system for synchronous drive of a DC motor, and more specifically to a control system for forced synchronization in which whenever the speed of the DC motor varies from a predetermined synchronous speed governed by a reference signal, the speed may be brought back quickly to the synchronous speed as desired.

2. Description of the Prior Art

DC motors are divided into so-called DC commutator motors using a commutator and brushes for distributing and supplying electric power from a DC source to the field windings and so-called brushless motors, without using such brushes, having a rotor with magnetic poles opposite in polarity, a field system with coils for producing magnetic flux, and a flux detector such as a Hall effect element and the like for switching over power from the DC source and supplying it to individual coils.

There have been presented various methods of controlling speed of the DC commutator motor, which are put to practical use. In most of such conventional methods motor speed is detected, and output thus obtained is compared with a reference speed for producing a signal corresponding to any difference therebetween so that a speed control circuit may be operated with the signal. This is not suitable for high precision speed control because of high drift.

On the other hand, some synchronous drive systems for prior-art DC brushless motors have been devised, which cannot, however, eliminate the phenomena of so-called "step out" effectively. Such phenomena may often occur in the following way:

1. As a DC motor of this type approaches its synchronous running state, it tends to be synchronized with some of the higher or lower harmonics of a reference signal frequency for synchronous operation, and consequently synchronous speed cannot be obtained as desired.

2. Even if the average power supplied to the driving coil of the DC motor is as much as that for normal synchronous operation, pulse power may not be such as to have equal pulse width, and thus so-called "beat signals" varying periodically tend to often occur. Under this condition the motor may be kept anyhow at a constant speed, which is different from a predetermined speed. This speed may vary directly when the load is changed. Thus, no constant speed can be obtained.

SUMMARY OF THE INVENTION

An object of this invention is to provide a synchronous drive control system for quickly restoring synchronous operation of a DC motor out of such step out as described above.

Another object of this invention is to provide a synchronous drive control system for realizing high-precision synchronous revolutions by arrangement of a comparator for shaping the pulse width of driving current to the DC motor, means for generating two trains of signals to be applied to said comparator for switching on and off current to the DC motor, and means for generating control signals for controlling the setting and resetting of said comparator so that the pulse width of motor driving current may be properly shaped.

A further object of this invention is to provide a synchronous drive control system for improving accuracy in DC motor speed control and stability thereof by providing two different trains of signals applied to a flip-flop circuit for shaping the pulse width of motor driving current, said signals being used for setting and resetting said flip-flop circuit, may correspond properly to a reference signal and the fundamental frequency of a pulse signal in response to speed of the DC motor.

A still further object of this invention is to provide a synchronous drive control system for quickly restoring synchronous operation out of step out condition by generating a train of rate pulse signals corresponding to the value obtained by detection of the speed of a DC motor, comparing a train of such signals with a train of reference signals supplied externally for constantly driving said DC motor through a flip-flop circuit, and controlling motor speed with the output produced due to a phase difference therebetween, said train of rate pulse signals being supplied to low and high pass filters whose cutoff frequency is the frequency of said reference signals so that step signals may be generated with the output from these filters, said step signals being applied to said flip-flop circuit.

A still further object of this invention is to provide a synchronous drive control system for preventing the step out condition from occurring by the addition of means for multiplying the frequency of said rate signal obtained by detection of the speed of a DC motor so that a step signal may be generated so as to be used for preventing step out by passing output from said means through low and high pass filters whose cutoff frequency is the frequency of the reference signal corresponding to the synchronous speed of the DC motor.

A still further object of this invention is to provide a system for operating a DC motor in forced synchronization, in which a rectangular wave signal is produced by controlling a flip-flop circuit with a reference pulse having a frequency corresponding to a preset reference speed and a rate pulse having a frequency corresponding to speed of said DC motor so that synchronous operation may be accomplished by controlling the pulse width of said signal, and in which means are provided for detecting the speed of said DC motor by AC tacho-generator and producing said rate pulse by transforming the output therefrom into a pulse signal, and means for changing the level of output from said tacho-generator in response to said reference speed and converting the output thus obtained into an analog signal, so that said flip-flop circuit may be controlled with said analog signal for forced synchronization.

A still further object of this invention is to provide a control system for synchronous operation of a DC motor, in which a rectangular wave signal is produced by controlling a flip-flop circuit with a rate pulse of a frequency corresponding to the speed of said DC motor and a reference pulse of a frequency corresponding to a reference speed so that synchronous operation may be achieved by changing the pulse width of said signal, and in which an up-down counter is provided for up counting operation with said reference pulse and down counting operation with said rate pulse so that faulty synchronous operation may be prevented by controlling set or reset input signals applied to said flip-flop circuit by converting output from said counter into analog signals.

These and other objects and features of this invention will be made clear from the following detailed explanation with reference to the accompanying drawings.

BRIEF DESCRIPTION OF THE DRAWINGS

FIG. 6 is a block diagram showing a second embodiment of this invention;

FIG. 11 is a block diagram showing a third embodiment of this invention;

FIG. 17 is a block diagram showing a modification of the system of FIG. 15;

DESCRIPTION OF THE PREFERRED EMBODIMENTS

Figure 1:
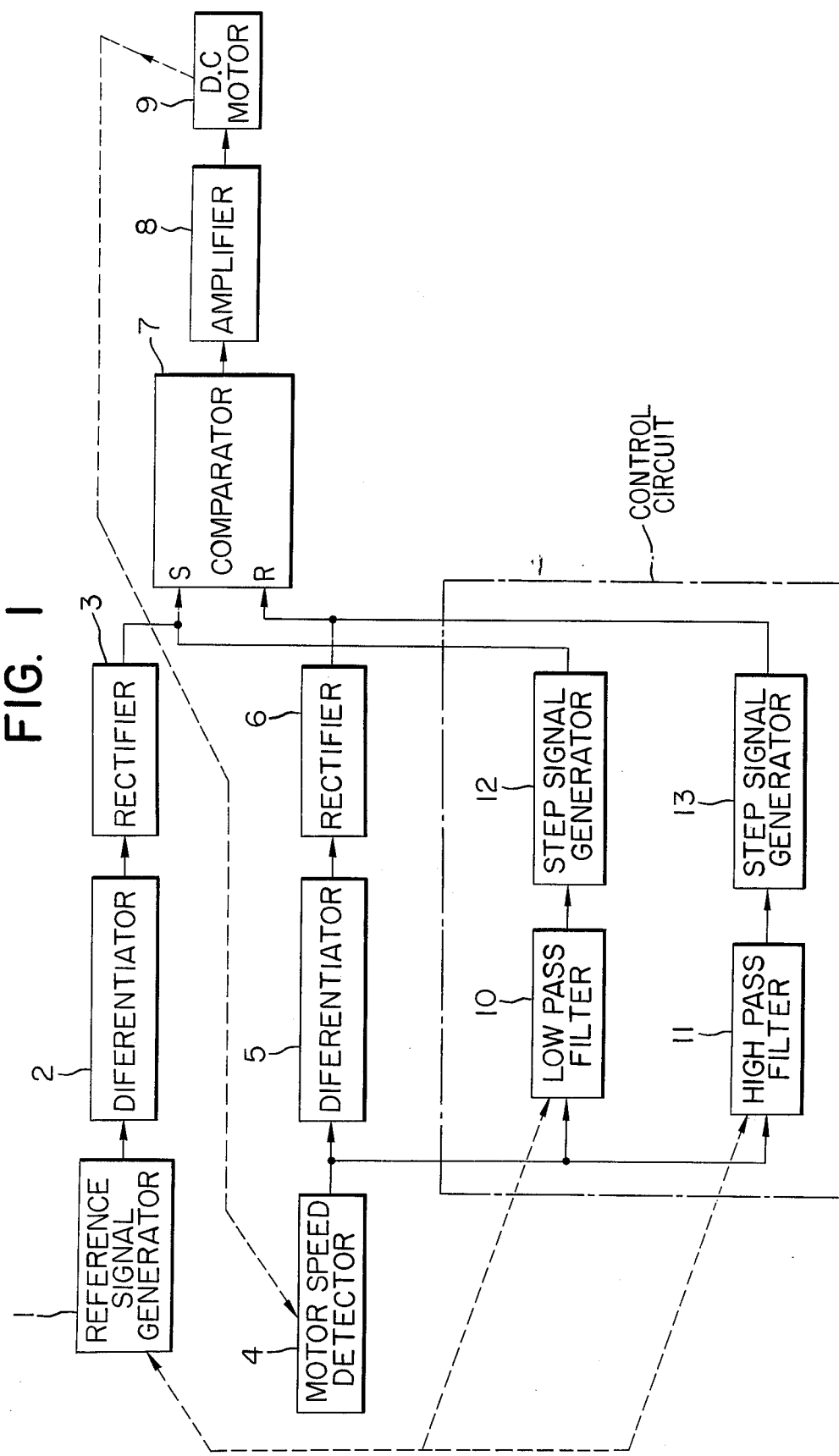
FIG. 1 is a block diagram showing one embodiment of this invention.

FIG. 1 is a block diagram showing the arrangement of a synchronous drive control system for a DC motor in accordance with this invention. In the drawing a circuit 1 for generating a reference frequency signal to operate the DC motor at a fixed number of revolutions as required is connected to a circuit 2 for shaping and differentiating signal waves, which is connected to a rectifier 3 for producing positive or negative pulse signals. A motor speed detector 4, such as AC tacho-generators for detecting speed of a DC motor 9 and generating AC signals of a frequency proportional thereto is connected at its output to a circuit for shaping and differentiating such AC signal waves. To the output of this differentiating circuit is connected a rectifier 6 for producing positive or negative pulse signals likewise as described above.

A train of output pulse signals from said first rectifier 3 are hereinafter called reference pulses, while those from said second rectifier are called speed or rate pulses. A flip-flop circuit 7 having set and reset terminals S and R to receive these two pulses as input signals is connected as means for comparing such signals from said two rectifiers.

This flip-flop circuit is connected at its output to an amplifier 8, which in turn is connected to the driving coil in the DC motor.

The motor speed detector 4 for detecting revolutions of the DC motor 9 is related mechanically, electrically, electromagnetically, or optically to said DC motor. As the detector of this kind may be used the forgoing tacho-generator or other conventionally known devices such as photoencoders, mechanical governors and the like.

A main feedback loop for so-called constant speed control is formed of DC motor 9, motor speed detector 4, differentiator 5, rectifier 6, comparator 7, amplifier 8, and DC motor 9, in such connection as shown.

In accordance with this invention a second feedback loop for motor speed control is provided in addition to the main feedback loop for controlling the DC motor speed. In other words, control means CON for forced synchronization is connected to the output terminal of the motor speed detector 4, said means having two output terminals, one connected to the set terminal S of said flip-flop circuit and other connected to the reset terminal R thereof. Thus the second feedback loop is formed of DC motor 9, motor speed detector 4, control means CON for forced synchronization, flip-flop circuit 7, amplifier 8, and DC motor 9, connected as shown.

One embodiment of such control means for forced synchronization is shown in block in FIG. 1. To the output terminal of the motor speed detector 4 are connected to a low pass filter 10 and a high pass filter 11 so as to receive a train of speed pulse signals. The cutoff frequency fcl of the low pass filter 10 is chosen between $f$ and $½ f$, $f$ being the frequency of said reference speed signal, and more preferably in the vicinity of $f$. The cutoff frequency $fch$ of the high pass filter 11 is set between $f$ and $2f$, and more preferably near the frequency $f$. Such relations are typically indicated as their frequency responses in FIG. 4. Output terminals of these filters are connected to step signal generators 12 and 13 respectively, which transform output signals therefrom into perfect step signals. Step signals corresponding to output signals from the two filters are supplied to the set and reset terminals of said flip-flop circuit as inputs respectively.

Figure 3:
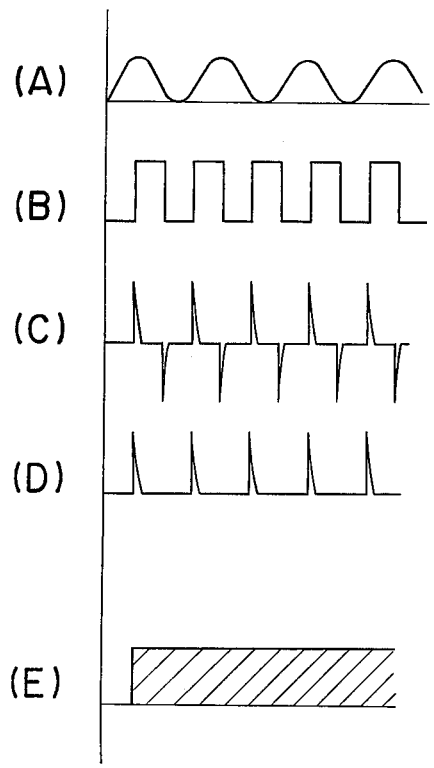
FIGS. 3(A) to 3(E) show waveforms of signals in main circuits shown in FIGS. 1 and 2.

Now, the operation of the arrangement shown in FIG. 1 will be explained with reference to FIGS. 3 to 5.

A train of reference pulses having such signal waveform as shown in FIG. 3(B) are generated at a specific period in the generator 1, and are then differentiated into a train of signals having such waveform as shown in FIG. 3(C). The latter signals are rectified through the rectifier 3 into a train of positive reference pulse signals as shown in FIG. 3(D), which are applied to the set terminal S of the flip-flop circuit 7 so as to operate the circuit. This state is kept until the reset terminal R receives any input signal. Such motor driving signals are then amplified and fed to the DC motor 9 to operate. Corresponding to the revolutions of the motor 9, there are generated AC signals as shown in FIG. 3(A) by means for detecting motor speed such as an AC tacho-generator. Such AC signals are differentiated in the differentiator 5 and are then rectified through the rectifier 6 similarly into a train of positive or negative pulse signals (a train of speed pulse signals), which are applied to the rest terminal of said flip-flop circuit 7 so as to bring the circuit into its off state. In other words, the flip-flop circuit 7 may produce at the output terminal rectangular wave signals as indicated in FIG. 5(C), which rise in the phase of the reference pulse signals and fall in the phase of the speed pulse signals. The widths of such rectangular pulses (So) correspond to phase differences between a train of reference pulse signals (Sg) and a train of speed pulse signals (Sr). Speed of the DC motor 9 is determined by the pulse width, and consequently the DC motor is made to operate in synchronization with the output signals from the reference signal generator 1.

However, in a conventional motor speed control system having the main feedback loop alone as described above, the pulse width of a rectangular wave signal from the flip-flop circuit varies as indicated by So, and Sol in FIGS. 5(C) and 5(F) with the period of a train of speed pulse signals varying as indicated by Sr and Srl in FIGS. 5(B) and 5(E) respectively, even when the period of a train of reference pulse signals Sg is constant as shown in FIGS. 5(A) and 5(D). Rectangular wave output So2 at regular intervals cannot be obtained until intervals between the speed and reference pulses are made equal as indicated by SG, SR2 and So2 in FIGS. 5(G) to 5(I) when a steady state or synchronous operation is obtained. In such synchronous operation the speed pulse frequency must be identical with the reference pulse frequency. In prior art devices faulty synchronous operation (at a speed different from desired revolutions) tends to occur when the speed pulse frequency becomes n times or 1/n the reference pulse frequency any of (higher or lower harmonics). FIGS. 5(J) and 5(K) show pulses SR3 twice the reference frequency and the output waveform So3 from the flip-flop during synchronous operation under such condition. FIGS. 5(L) and 5(M) show pulses SR4 half the reference pulse frequency SG and the output waveform So4 from the flip-flop during synchronous operation under such condition.

In such erroneous synchronous operation the motor may seem to rotate in a stable state. However, this stable state will be disturbed directly when any change appears in motor loading, and the motor can be hardly brought back to the true, synchronous state.

Figure 4:
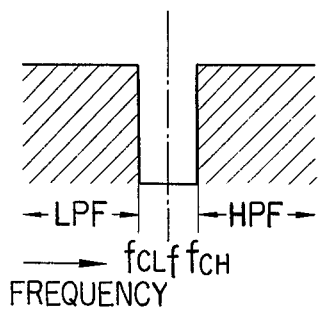
FIG. 4 is a diagram showing frequency responses of low pass and high pass filters used in the circuits of FIGS. 1 and 2.
Figure 5:
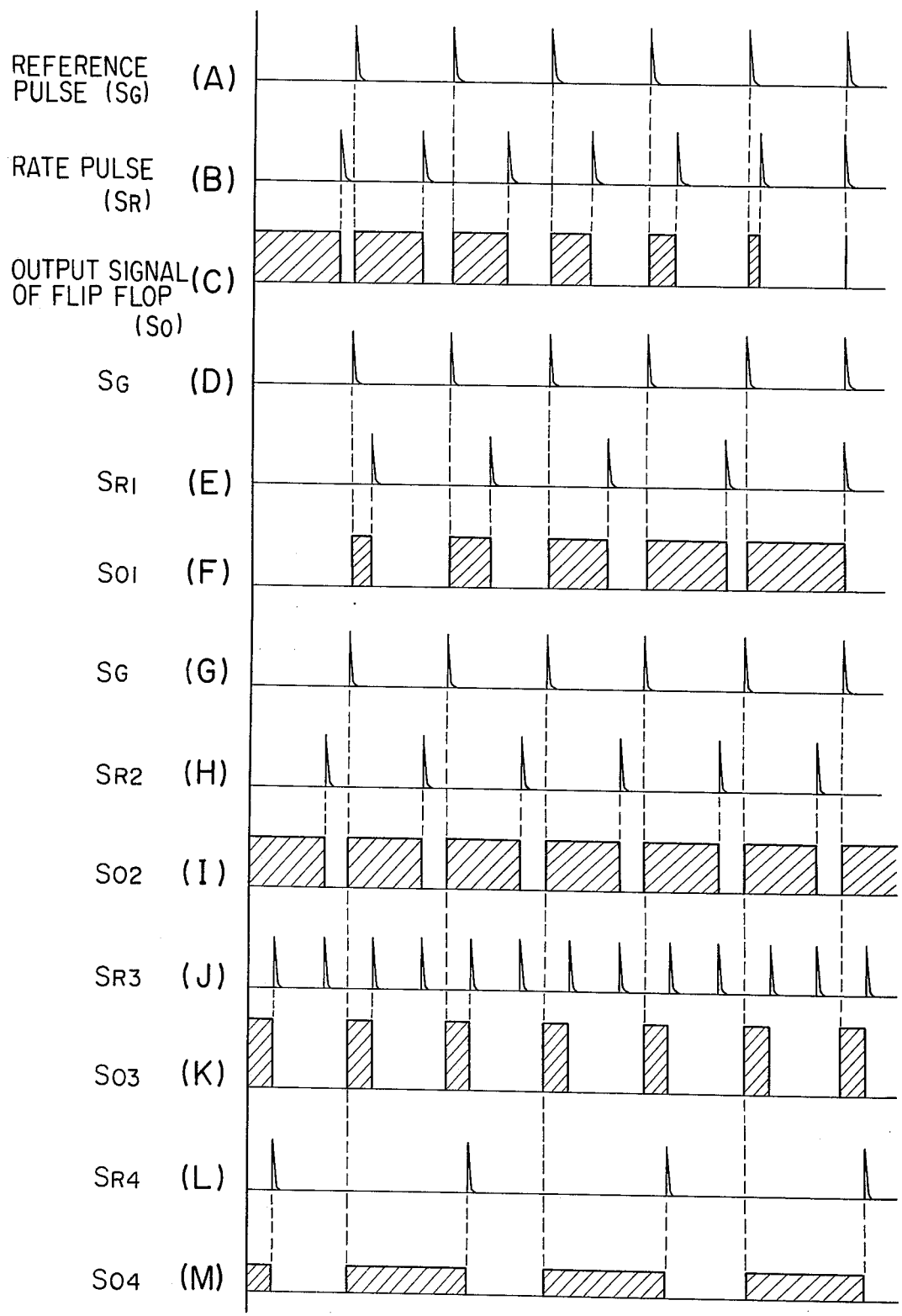
FIGS. 5(A) to 5(M) are graphs showing various waveforms of reference pulses, speed pulses, and control pulses in response to phase difference therebetween, which may appear in a synchronous drive control system for DC motors of this invention or of prior art.

Such a disadvantage may be eliminated by the use of low pass and high pass filters 10 and 11, which have frequency responses as shown in FIG. 4.

The high pass filter 11 passes higher harmonic components only of the rate pulse, which has the frequency f of the reference pulse signal, which the low pass filter 10 passes lower harmonic components only thereof. Thus, assuming that output from the motor speed detector 4 exceeds the cutoff frequency fch of the high pass filter 11, a step signal may appear at the output of a step signal generator 13 in direct current as indicated in FIG. 3(E), with output from the filter 11, and is applied as input to the R terminal of the flip-flop circuit 7. As a result, motor driving current is cut off and revolutions of the motor 9 are reduced. As motor speed approaches the reference synchronous speed, output from the high pass filter 11 is decreased, and a reset pulse from the rectifier 6 is applied to the flip-flop. Thereafter, on and off operations of the flip-flop are repeated alternately with the reference and rate pulses until normal synchronous operation is restored.

Now assuming that output from the motor speed detector 4 such as tacho-generator becomes lower than the cutoff frequency fcl of the low pass filter 10, a step signal may appear at the output of the step signal generator 12 with output from the filter 10, and is applied to the set terminal of the flip-flop circuit 7. Consequently, motor driving current is turned into direct current, likewise as described above, as indicated in FIG. 3(E), and motor revolutions are increased approaching the reference motor speed. As the motor speed approaches the reference speed, output from the low pass filter 10 is reduced, and the reference pulse becomes a set signal to the flip-flop circuit 7 with the result of induction of the DC motor into normal synchronous operation. When the frequency of AC output produced in the motor speed detector 4 is in the vicinity of the reference speed signal f, no signal is generated at the output of the filter 10 or 11, and the circuits 12 and 13 produce no step output. Thus, normal synchronous operation is maintained. For changing the reference speed by adjusting the generator 1 the cutoff frequencies of the high and low pass filters 11 and 10 may be changed in relation to such adjustment.

Synchronous operation determined by the cutoff frequencies of these filters may be realized without the reference signal generator 1 by making their cutoff characteristics so sharp as to reset the flip-flop circuit with output from the high pass filter 11 and set it with output from the low pass filter 10.

As has been described above, the synchronous operation system, of this invention permits prevention of faulty synchronous operation and such beat phenomena as already described, which may otherwise occur when output from the tacho-generator becomes any of higher or lower harmonics of the reference pulse, whereby it is possible to achieve extremely stable synchronous operation and improve accuracy in the control of DC motor speed. This is a great advantage.

Figure 2:
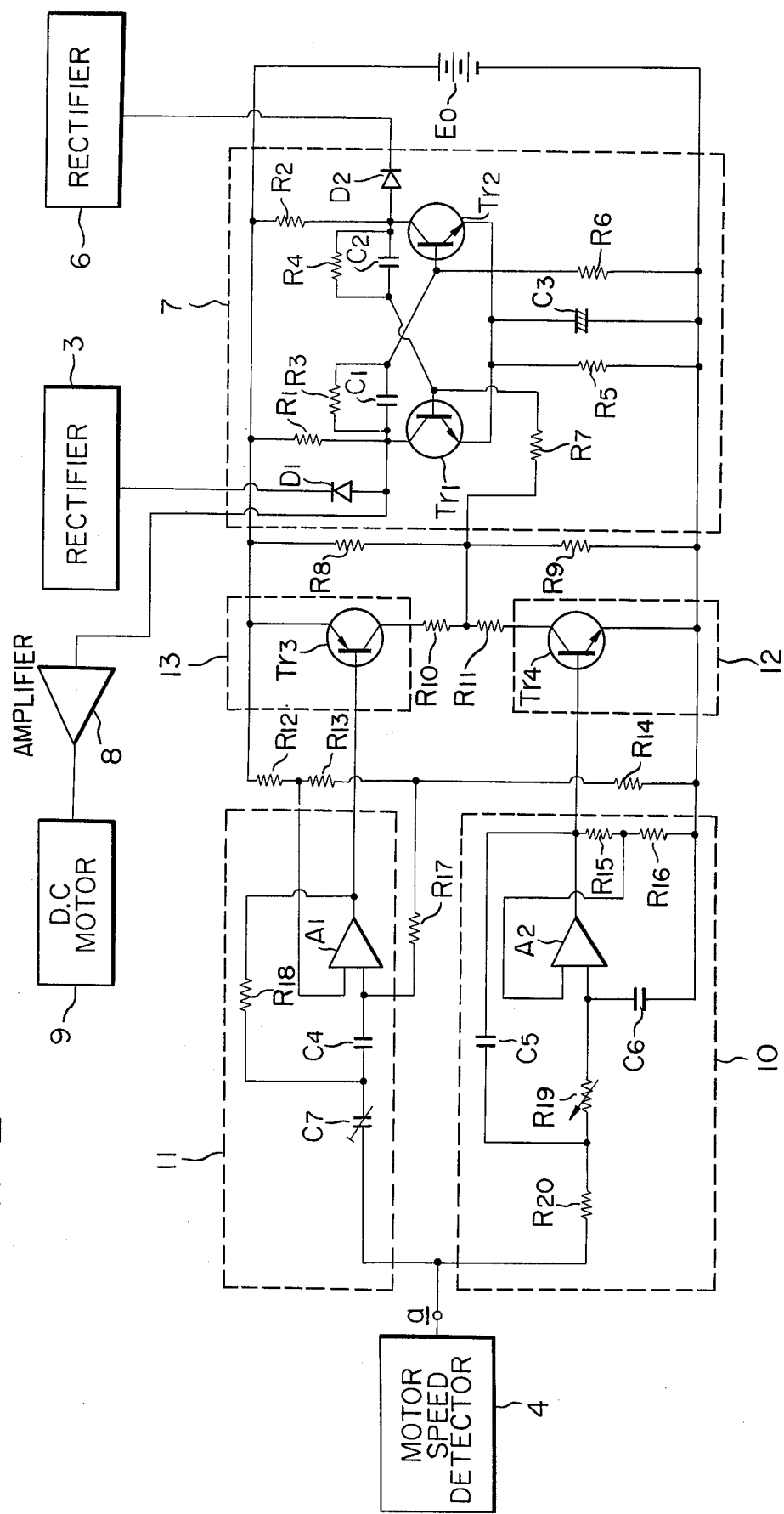
FIG. 2 is a circuit diagram showing a practical example of a control circuit for forced synchronization in FIG. 1.

FIG. 2 is a circuit diagram of flip-flop circuit 7, low pass filter 10, high pass filter 11, and step signal generators 12 and 13, which are indicated in block in FIG. 1 and where the same symbols represent the same parts or components. Eo represents a power source.

The flip-flop circuit 7 may be such as is well known, which consists of transistors Tr1, Tr2, capacitors C1, C2, C3, diodes D1, D2, and resistances R1 to R7. The low pass filter 10 consists of input resistance R20, variable resistance R19, amplifier A2, resistances R15, R16 for operating the amplifier A2, and capacitor C5, with its output terminal connected to a transistor Tr4 forming the step signal generator 12.

The high pass filter 11 consists of variable capacitor C7 for frequency setting, capacitor C4, resistance R18, and amplifier A1, with its output connected to a transistor Tr3 forming a step signal generator 13. The resistances R8, R9, R14 and R17 are used as coupling resistances, too.

The collectors of the transistors Tr3 and Tr4 are connected to the base of the transistor Tr1 and to the collector of the transistor Tr2 through load resistances R10 and R11 and the resistance R7 in the flip-flop circuit 7 respectively. The collectors of the transistors Tr1 and Tr2 are connected to the rectifiers 3 and 6 through the diodes D1 and D2 respectively, while the collector of the transistor Tr1 is connected to the input terminal of the amplifier 8.

Now, the operation of these circuits will be explained.

AC signals applied from the motor speed detector 4 to the input terminals of the high and low pass filters 10 and 11 through the input terminal $a$ may and may not pass through, according to their respective cutoff frequencies.

If the frequency of an input signal at the terminal $a$ is higher than the cutoff frequency of the high pass filter 11, it may pass through the filter 11 and is applied to the input of the step signal generator 13. The signal at this time is an analog signal of a certain level and makes the base of the transistor Tr3 in the circuit 13 biased positively. The collector of Tr3 is made almost positive, and the base of Tr1 is biased positively through the resistances R10 and R7. As a result, the transistor Tr1 in the flip-flop circuit is turned on, and at the same time the collector is reduced in potential so as to supply a signal to cut off driving current to the motor to the amplifier 8 connected its amplification. Thus, current supply to the motor 9 is interrupted with this input signal, and the motor speed is reduced.

Reversely, when the frequency of the input signal at the terminal $a$ is lower than the cutoff frequency of the low pass filter 10, the transistor Tr4 is turned on, and at the same time the collector is lowered in potential. Consequently, the transistor Tr1 is turned off so as to permit application of high potential to the motor 9 and increase the motor speed.

FIG. 6 shows a second embodiment of this invention, where individual parts or components of a system for synchronous operation of a DC motor are indicated in block, said system in which synchronous revolutions are reached by generating rectangular signals from a flip-flop circuit controlled with a reference pulse having a frequency corresponding to a certain predetermined reference motor speed and with a rate pulse having a frequency corresponding to revolutions of the DC motor and controlling the pulse width, comprises means for detecting revolutions of said DC motor through an AC tacho-generator and producing said rate pulse by transforming output therefrom into a pulse, means for multiplying the frequency of said output, and means for producing step signals by passing output from the preceding means through low and high pass filters with a cutoff frequency corresponding to said reference speed, characterized in that said flip-flop circuit is controlled with the step signals from said means, whereby synchronous operation is forcibly achieved.

In addition to the above arrangement, a monostable multi-vibrator to be triggered with said rate pulse, a circuit for generating a pulse signal with the output from said multi-vibrator, and a reverse circuit to be triggered with a pulse signal from said circuit may be provided for controlling operation by supplying reverse current from said circuit during interruption of driving current to the motor. Such arrangement as characterized above is also shown in block.

In the above arrangement the same parts or components as in FIG. 1 have the same symbols for brevity and simplicity of explanation.

In the drawing, 1' represents a frequency divider, which is used to divide a high frequency, as produced by a crystal oscillator employed as an oscillator 1 by $n$, 4' represents a frequency divider for shaping output from a motor speed detector 4 such as a tacho-generator into a rectangular wave. Numeral 14 is a multiplier for multiplying output from the detector 4 by $n$ (for instance twice by full wave rectification), 15 is a monostable multivibrator to be operated with a reset input pulse from the flip-flop circuit 7, 16 is a control circuit for controlling a reverse power circuit 17 for the motor with a signal from the multivibrator 15, and 17 is the reverse power circuit for braking the motor by imparting reverse torque to the motor.

Now the operation of this system will be explained.

While the DC motor 9 is running at a certain speed, the motor speed detector 4 such as a tacho-generator generates AC output having a frequency corresponding to the motor speed, said detector 4 being interlocked to the motor 9. The output is differentiated in a differentiator 5 and is then rectified in a rectifier 6 to produce a train of positive pulses. This is a rate pulse, which is applied as a reset signal to the terminal R of the flip-flop circuit 7. On the other hand, output from the generator 1 for generating a signal having a frequency corresponding to a certain predetermined reference speed is differentiated in 2 and is then rectified in 3 so as to produce a train of positive pulses. This is a reference pulse, which is applied as a set signal to the terminal S of the flip-flop circuit 7 is turned on with the phase of the reference pulse, and is turned off with the phase of the rate pulse, rectangular wave signals, which pulse widths correspond to phase differences between the two pulses, may appaear at the output of the flip-flop circuit 7. Such signals are amplified in 8 so as to drive the DC motor 9. Now assuming that the frequencies of the two pulses are identical, phase differences or pulse widths output rectangular waves are made equal, and thus speed of the DC motor 9 is kept constant. This is the condition under which the motor 9 is in synchronous operation. If motor speed is decreased below the reference speed due to some reason, the frequency of output from the tacho-generator 4 interlocked thereto must be lowered accordingly.

Thus the phase of the reset pulse (rate pulse) to the flip-flop circuit 7 is delayed with the result of changing phase differences between the rate and reference pulses and making pulse widths greater (see FIG. 5(F)). As a result, the conduction angle of driving current to the motor 9 is increased, and the motor speed is made higher, returning to synchronous rotations. If the speed of the motor 9 becomes faster, a reset signal (rate pulse) is reversely moved forward in the flip-flop circuit 7, and pulse widths of output rectangular waves from 7 vary so as to be made narrower (see FIG. 5(C)). Thus the conduction angle of driving current to the motor is decreased, and motor speed is made lower, returning again to the synchronous speed. Heretofore, normal synchronous drive has been described. Synchronous operation may be realized even when motor speed becomes $n$ times the reference speed (see FIGS. 5(J) and 5(K), or $1/n$ thereof (see FIGS. 5(L) and 5(M). The motor runs in the state of faulty synchronous operation. To prevent this, low and high pass filters 10 and 11 are connected to the output of the motor speed detector 4 with their cutoff frequencies so selected as to pass frequencies lower than half the frequency corresponding to the reference speed through the filter 10 and frequencies higher than twice the frequency through the filter 11. In this manner output may appear at the output terminal of the low pass filter 10 when speed of the DC motor 9 is reduced below half the reference frequency, and a step signal is produced at the output of the step signal generator 12. This step signal is applied to the set terminal of the flip-flop circuit so as to produce DC output of a constant value therefrom. Consequently revolutions of the DC motor 9 are sharply increased, returning to the synchronous state. Reversely, when motor speed is increased up to more than twice the reference frequency, output may appear from the high pass filter 11, and a step signal is produced at the output of the circuit 13. This signal is applied to the reset terminal of the flip-flop circuit 7 so as to reduce output therefrom to zero. As a result driving current to the motor 9 is cut off and revolutions of the motor 9 are sharply decreased, returning to the synchronous state. What has been described above is on forced synchronization.

In view of difficulty in the manufacture of said filters, particularly of the low pass filter having a sharp filtering characteristic in the low frequency range to be used in case of low speed revolutions in the synchronous drive system as described above, a frequency multiplier 14 is provided in this invention for increasing the frequency of a signal from the motor speed detector 4. before its application to said filters 10 and 11 so that the filter function may be fully effected, and means also is provided for dividing the frequency of output from the detector 4 and converting it into pulses as required. In this manner the cutoff frequencies of the low and high pass filters 10 and 11 can be made higher and used as filters having good cutoff characteristics. Furthermore, for detecting a period of the reset state of the flip-flop circuit 7 or a period of no flowing of driving current to the motor is provided a mono-satable multivibrator 15 to be operated with a reset signal which output triggers the reverse power control circuit 16. Control current is supplied from the reverse power control circuit 16 to the DC motor for improving its response characteristic. One embodiment of such circuits are shown in FIGS. 7 to 9.

Figure 7:
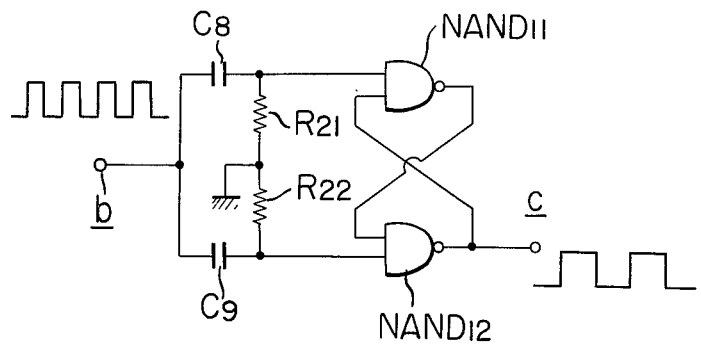
FIG. 7 is a circuit diagram of a frequency divider which may be employed in the circuit of FIG. 6.

FIG. 7 shows an example of the frequency divider 1' or 4' as described above, where b represents the input terminal, c the output terminal, C8 and C9 capacitors connected therebetween, R21 and R22 resistances for discharging such capacitors, and NAND 11 and NAND 12 NAND gates. This circuit may be such as is well known, which operation may be readily understood by those skilled in the art, and explanation is omitted. With a train of pulse signals as indicated in FIG. 7, applied to the input terminal b, signals having half the frequency are produced at the output terminal C.

Figure 8A:
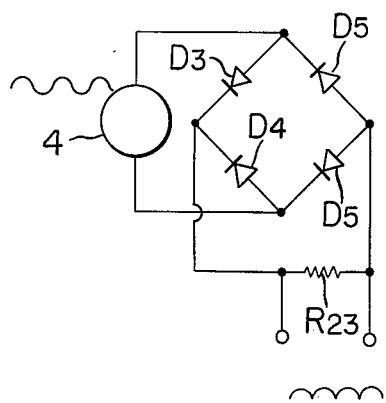
FIGS. 8A and 8B are circuit diagrams of practical circuits of a frequency multiplier applicable to the circuit of FIG. 6.

FIG. 8 shows some practical examples of the frequency multiplier 14, FIG. 8A shows a full-wave rectifier for doubling a frequency, in which when a signal having a frequency as shown is applied from the detector 4 such as an AC tacho-generator and the like, a signal having twice the frequency as shown is produced at the output terminals across a resistance 23 after full-wave rectification by means of diodes D3 to D6.

Figure 8B:
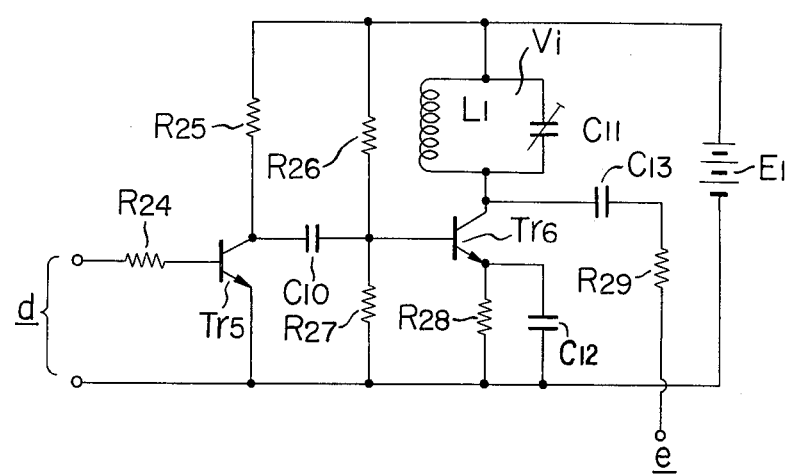

FIG. 8B shows another multiplier, which has input resistance R24, load resistance R25, bias resistances R26, R27, and R28, output resistance R29, transistor amplifiers Tr5 and Tr6, coupling capacitor C10, capacitor 12 for frequency improvement, output capacitor C13, and resonance circuit Vi consisting of coil L1 and variable capacitor C11. The operation will be explained here. When an AC signal is applied to the input terminal $d$, a pulse-like distorted wave signal is produced from the collector output terminal after shaping and proper amplification through a transistor Tr5. Such a distorted wave contains higher harmonics of the $n$th order. This output signal is supplied to the base of a transistor Tr6 and is amplified adequately. The signal containing such higher harmonics of the $n$th order applied to the transistor Tr6 is amplified selectively in the resonance circuit Vi connected to the collector. Thus, a signal having frequency components determined by the coil L1 and the capacitor C11 of preset values is produced at the output terminal $e$ through the output capacitor 13 and resistance R29.

Figure 9A:
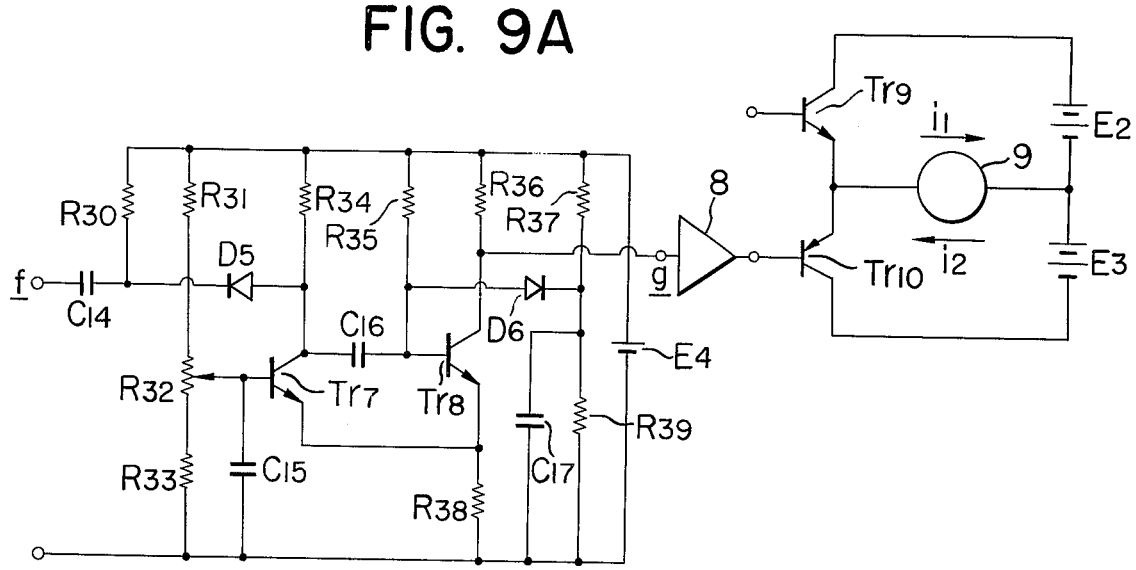
FIG. 9A is a circuit diagram showing another example of a forced synchronization control circuit applicable to the circuit of FIG. 6.

FIG. 9A shows an example of a circuit for supplying driving current i1 and reverse current i2 to the DC motor 9. A resistance R30 and a capacitor 14 form a differentiator, and diodes D5, D6 used as trigger diodes, resistances R31 to R39, capacitors C15 to C17, and transistors Tr7 to Tr10 form a monostable multivibrator. E4 represents a power source for supplying power to the circuit, and E2 and E3 power sources for feeding current to the DC motor 9.

Now, the operation will be explained.

Figure 9B:
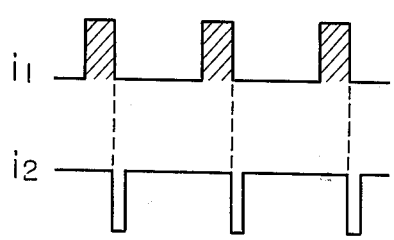
FIG. 9B is a graph showing the waveform of a signal in FIG. 9A.

When a step signal or a rectified signal is supplied from the circuit 13 or 6 in FIG. 6 to the input terminal $f$, conduction of the transistor Tr7 is increased, and collector potential is lowered. Consequently base potential of the transistor Tr8 is reduced which is thus brought into its off state. As the collector is put at high potential, a high-potential signal is produced at the output terminal $g$. This state may be maintained, depending on the time constant determined by the resistance R35 and the capacitance C16, and thereafter, base potential of the transistor Tr8 is increased to be turned on and collector potential is lowered. Thus, a voltage level at the output terminal $g$ is decreased. This state may be kept until any subsequent signal is applied to the input terminal $f$. In other words, this circuit acts as a monostable multivibrator. Input trigger signals to this circuit are supplied one by one in the off state of driving pulse signals i1 for the DC motor as shown in FIG. 9B. Output signals from the multivibrator, that is, a train of driving pulse signals i2 are generated in response to the falling phase of said driving pulses, and may remain as driving pulses only for a short time dependent on the time constant determined by the resistance R35 and the capacitance C16. In other words, at each time when one driving pulse for the DC motor 9 is produced, one control pulse is generated without fail, as indicated in FIG. 9B, in response to the falling phase of the driving pulses. Such control pulses are opposite in polarity to the driving pulses so that currents opposite to each other may flow through the DC motor 9 by means of transistors Tr9 and Tr10, whereby motor driving, highly resistive against disturbances and reliable, can be realized.

Figure 10:
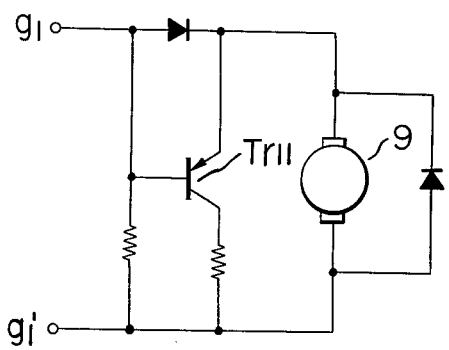
FIG. 10 is partial circuit diagram showing another example of a forced synchronization control circuit applicable to the circuit of FIG. 6.

FIG. 10 shows a circuit in which motor control is made without use of any separate power source as in FIG. 9. The DC motor 9 is operated with driving current in rectangular waveform as described above, which is applied to the input terminals g1 and g'1, and a reverse electromotive force is utilized which may be generated in the driving coil of the DC motor during suspension of such driving current. This reverse electromotive force is used so as to pass reverse current (control current) through the DC motor via the transistor Tr11. With a driving pulse the transistor Tr11 is kept off, and no control current may flow through the DC motor, while only for a period of no driving pulse it may flow so as to control the motor, whereby synchronous driving can be positively assured.

FIG. 11 shows a third embodiment of this invention, where a DC motor synchronous drive system is shown in block, said system being so arranged that a flip-flop circuit is controlled with a reference pulse having a frequency corresponding to a preset reference speed and a rate pulse having a frequency corresponding to speed of the DC motor so as to produce a rectangular wave signal, which pulse width is controlled for synchronous revolutions comprising means for detecting motor speed and producing the rate pulse by transforming output obtained by detection into a pulse, and means for varying output levels obtained by detection of motor speed with respect to said reference speed and converting such output into analog signals for controlling said flip-flop circuit so that synchronous revolutions may be forcibly obtained.

FIG. 11 shows a synchronous drive system of this invention, in which the arrangement is systematically represented and in which like parts are designated by like symbols in FIG. 1. In the drawing, 1' represents frequency variable means for a generator 1, 15 an analog converter for converting output from a motor speed detector 4 into analog signals, 14 a voltage switching circuit which may be switched over in relation to the reference speed.

Figure 12:
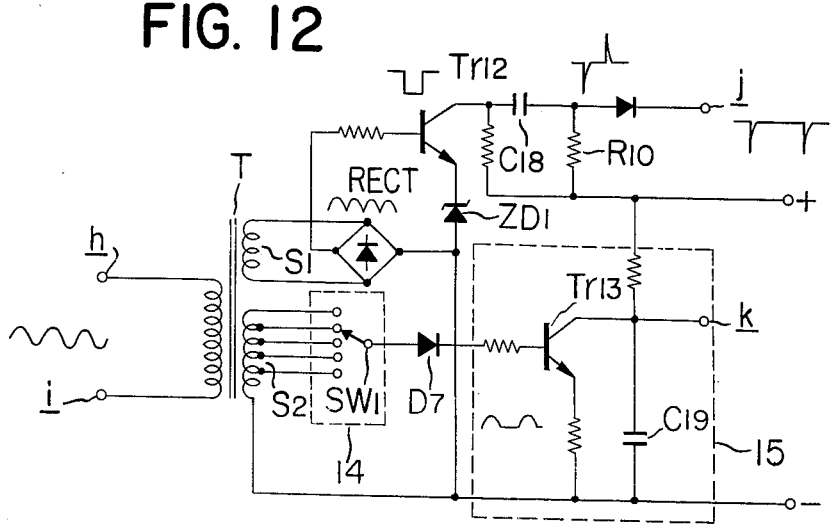
FIG. 12 is a circuit diagram showing the main part of an electrical circuit, which may be employed in the circuit of FIG. 6.

FIG. 12 is a circuit diagram of a forced synchronization device. In the drawing, AC output from the motor speed detector 4 is applied to between input terminals $h$-and $i$. T represents a transformer having the secondary winding S1, across which voltage is generated, rectified through a rectifier Rect, and applied to the base and emitter of a transistor Tr12 through a zener diode ZD1. When voltage after rectification becomes higher than a constant voltage across the diode ZD1, a rectangular wave pulse is generated at the collector of the transistor Tr12 in the circuit. This rectangular pulse is differentiated in a differentiator composed of C18 and R40, and is transformed into pulses, which are then supplied to the rest terminal R of the flip-flop circuit 7 in FIG. 11. Meanwhile, voltage generated across the secondary winding S2 of the same transformer is applied to the base of a transistor Tr13 through a change-over switch SW1 and a diode D7, is converted into analog voltage by means of a capacitor C19 connected to the collector of the transistor Tr13 and is then applied to the set terminals of the flip-flop circuit 7 in FIG. 11 along with the reference pulse. Now assuming that the DC motor is running at the reference speed, voltage across the capacitor C19 reaches a certain fixed value. In this case the flip-flop circuit 7 is set with the reference pulse from 3 and reset with the rate pulse from 6, when analog voltage across the capacitor C19 has no effect on the switching of the flip-flop circuit. If the motor is synchronized with any of lower harmonics of the reference frequency, voltage applied to the input terminals $h$ and $i$ in FIG. 12 is lowered, and consequently voltage across the capacitor C19 is decreased. Revolutions of the motor are sharply increased by setting the flip-flop circuit 7 with the analog voltage across the capacitor C19. On the other hand, if motor speed is brought into synchronization with any of higher harmonics of the reference frequency, analog voltage across the capacitor C19 becomes higher than the fixed value. This voltage is applied to the terminal S of the flip-flop circuit to cancel the setting function of the reference pulse, and consequently driving current to the DC motor is suspended with the result of a rapid decrease in motor speed. The DC motor 9 can be operated in force synchronixation by such functions as described above. Changing motor speed may be accomplished by adjusting the change-over switch SW1 in FIG. 12 interconnected with the frequency variable means 1' for the reference signal generator 1. Furthermore, stable synchronous revolutions may be obtained at extremely low speed just by changing over the switch SW1.

Figure 13:
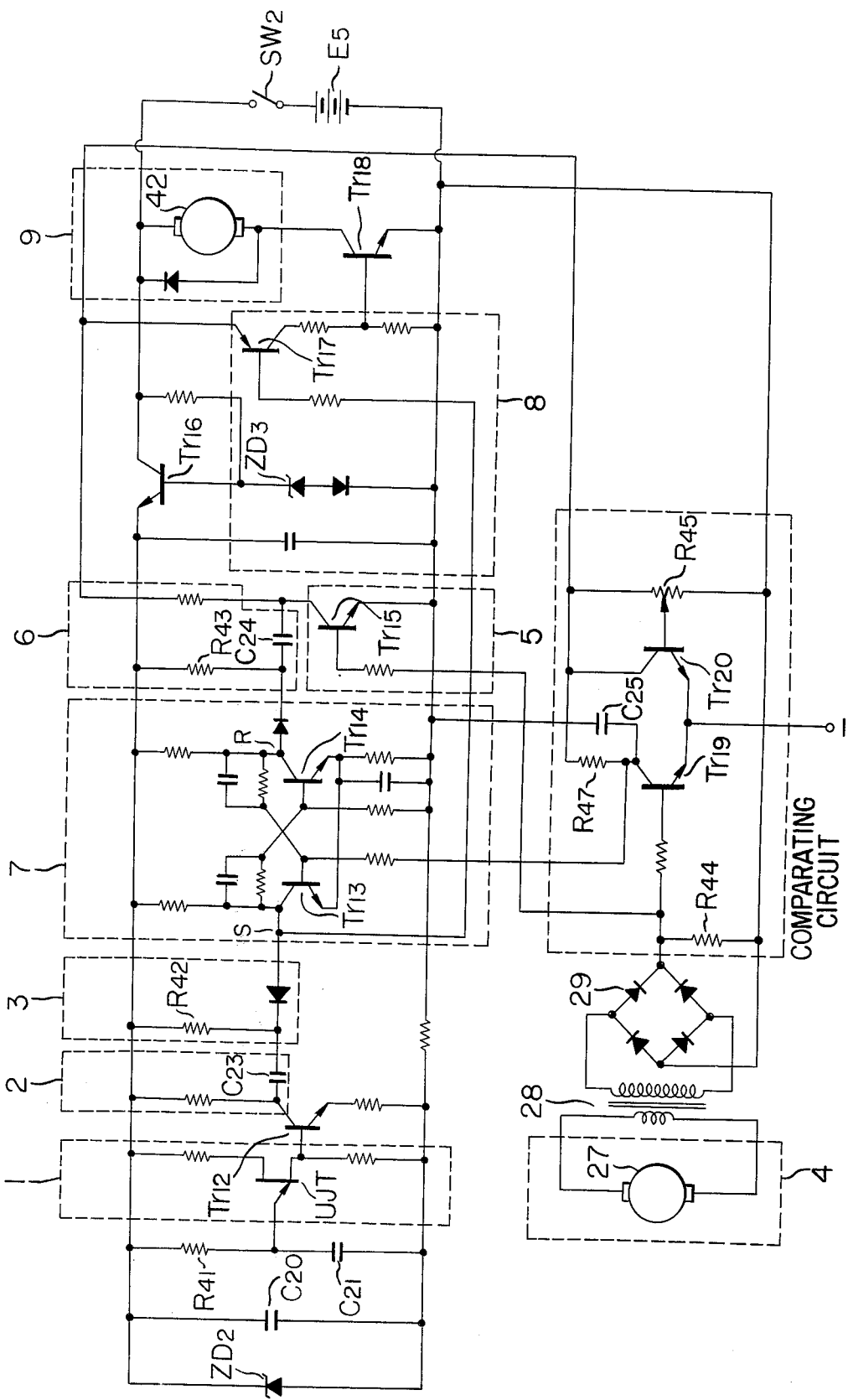
FIG. 13 is a circuit diagram of an electrical circuit applicable to the device of FIG. 11.

FIG. 13 is a circuit diagram of a synchronous drive system of this invention, showing one embodiment thereof. In the drawing, ZD2 represents a Zener diode, C20 a capacitor forming a constant voltage circuit, UJT a unijunction transistor to generate a reference pulse corresponding to a reference speed depending on the time constant determined by a resistance R41 and a capacitor C21, Tr12 a transistor amplifier, C23 and R42 a capacitor and a resistance forming a differentiator 6. Tr13 and Tr14 transistors forming a bistable multivibrator (flip-flop circuit) as is well known with set and reset input terminals S and R, 27 an AC tachogenerator for detecting speed of a DC motor in relation thereto, 28 a transformer, 29 a bridge type rectifier, R44 a load resistance to supply output after rectification one part of which to be applied to the reset terminal R of the flip-flop circuit 7 through a transistor amplifier Tr15 and the differentiator 6 composed of a capacitor C24 and a resistance R43 and other part of which to be applied to one input of transistors Tr19 and Tr20 in a comparator composed of differential amplifiers with other input to which a constant voltage corresponding to a preset speed is applied through a variable resistance R45 as a voltage divider and to be applied to the flip-flop circuit in the form of analog voltage across a capacitor 25 connected to the output of the comparator, Tr17 and Tr18 transistors in a motor drive circuit, Tr16 and ZD3 a transistor and a zener diode forming a constant voltage circuit, and 42 a DC motor interconnected with the tacho-generator 27.

Now, the operation of the synchronous drive system arranged as shown in FIG. 13 will be explained. When a DC voltage is supplied from a power source E5 by closing a switch SW2, a constant voltage is applied to the control circuit through the constant voltage circuit of the transistor Tr16 and the Zener diode ZD3. This voltage is further stabilized by means of the Zener diode ZD2 and the capacitor C20 so as to operate the circuit with higher stability. With the power switch SW2 turned on the UJT starts oscillations at a frequency determined by the time constant of the resistance 41 and the capacitance C21. The signal thus generated is amplified by Tr12 and is differentiated in the differentiator 3 composed of C23 and R42 and transformed into a unipolar pulse, that is, the reference pulse having a frequency corresponding to the reference speed. This pulse is applied to the set terminal S of the flip-flop circuit 7. On the other hand, at the output of the AC tacho-generator 27 running in relation to revolutions of the DC motor 42 is produced AC output having a frequency corresponding to the motor speed, which voltage is transformed by the transformer 28 and undergoes full-wave rectification so as to produce output across the load resistance R44. This output is divided into two parts, one part to be amplified by the transistor Tr15 and transformed into a pulse by means of the differentiator 6 of C24, and R43 so that the pulse may be applied to the reset terminal R of the flip-flop circuit 7, and other part to be supplied to one input of the differential amplifier composed of the transistors Tr19 and Tr20 so as to be compared with voltage across the variable resistance R45. Output obtained by such comparison is converted into analog voltage by the function of the capacitor C25 and the resistance R47 connected to the collector of the transistor Tr19 so as to be applied to the flip-flop circuit 7. In the drawing, if motor speed is increased, voltage after rectification from 29 is increased. Thus, base potential of Tr19 in the comparator becomes higher than that of Tr20 or potential corresponding to the reference speed, and the transistor Tr19 is turned on with the result of turning negative the base of the transistor Tr13 in the flip-flop circuit. The transistor Tr13 is turned off and Tr14 turned on with Tr17 and Tr18 off, and comsequently motor speed is decreased. Reversely, if motor speed is decreased, the transistor Tr19 is turned off, and thus base potential of Tr13 in the flip-flop circuit 7 is turned positive. The transistors Tr17 and Tr18 are turned on with the result of an increase in revolutions perminute of the DC motor 42. In other words, synchronous revolutions are forcibly produced by cutting of driving current to the DC motor when motor speed becomes too high and making the conduction angle of driving current 100 percent when too low. While the DC motor is running at a preset reference speed, the forced synchronization circuit has no effect on the base potential of the transistor Tr13, and the flip-flop circuit 7 is set with the reference pulse applied to the input S and is reset with the rate pulse to the input R. Thus, the state of synchronous revolutions can be maintained. Even if the oscillation frequency produced from the oscillator of UJT, R41, and C21, corresponding to the reference speed is changed in this system, the forced synchronization circuit may be operated at any preset reference speed all the time by changing the setting of the variable resistance R45 in the differential amplifier in relation to the oscillator.

Figure 14:
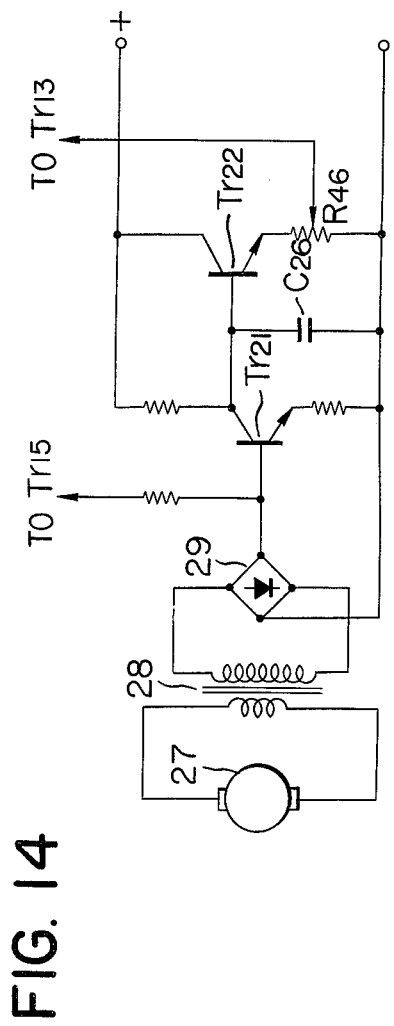
FIG. 14 is a circuit diagram modified partially, which may be used in FIG. 13.

FIG. 14 is a circuit diagram of a forced synchronization circuit in another embodiment of the synchronous drive control system of this invention, which a simplification of the circuit of FIG. 13. In this circuit no differential amplifier is employed, but a potentiometer R46 is provided as a load of an emitter follower transistor Tr22, which output is applied to the base of the transistor Tr13 in the flip-flop circuit 7 so as to operate it in the same way as described above.

In this embodiment an analog comparator is used as a circuit for comparison. Thus, the arrangement is simplified and the number of parts or components is decreased. This makes it possible to provide a compact system, for controlling DC motor drive.

Figure 15:
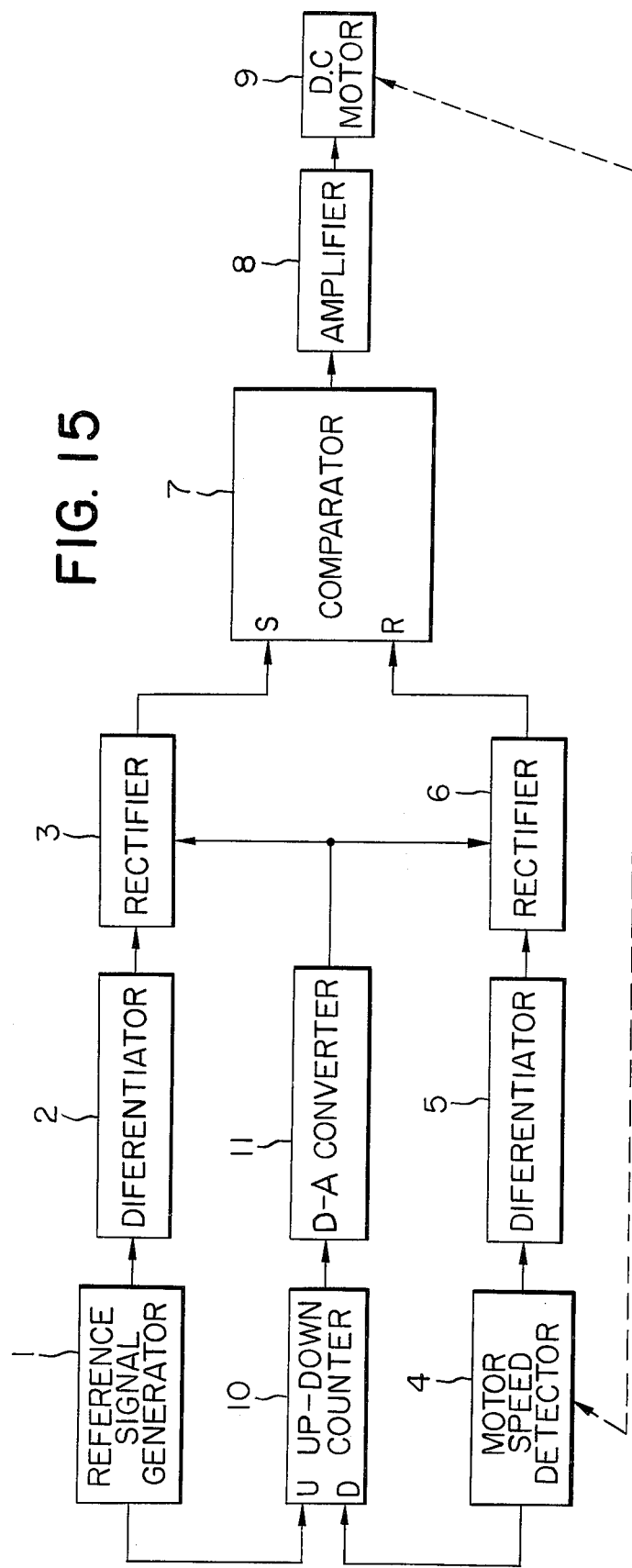
FIG. 15 is a block diagram showing a fourth embodiment of this invention.

FIG. 15 shows a fourth embodiment of this invention, in which a system for operating a DC motor in forced synchronization is presented in block diagram, where synchronous revolutions are obtained by controlling a flip-flop circuit with a rate pulse of a frequency corresponding to speed of the DC motor and with a reference pulse of a frequency corresponding to a reference speed so as to produce rectangular wave signals, and varying their pulse widths, and where a up-down counter is provided, which may count up with said reference pulse and down with said rate pulse and which output is converted into analog voltage for controlling set and reset inputs of said flip-flop circuit. Like symbols represent like parts or components in the preceding embodiments, which explanation is omitted here.

In the drawing, the up-down counter 10 is connected at the up input terminal U to a reference signal generator 1 and at the down input terminal to a motor speed detector 4. Said counter is connected at the output terminal to a D-A converter 11, which is connected at the output terminal to the foregoing rectifiers 3 and 6.

Figure 16:
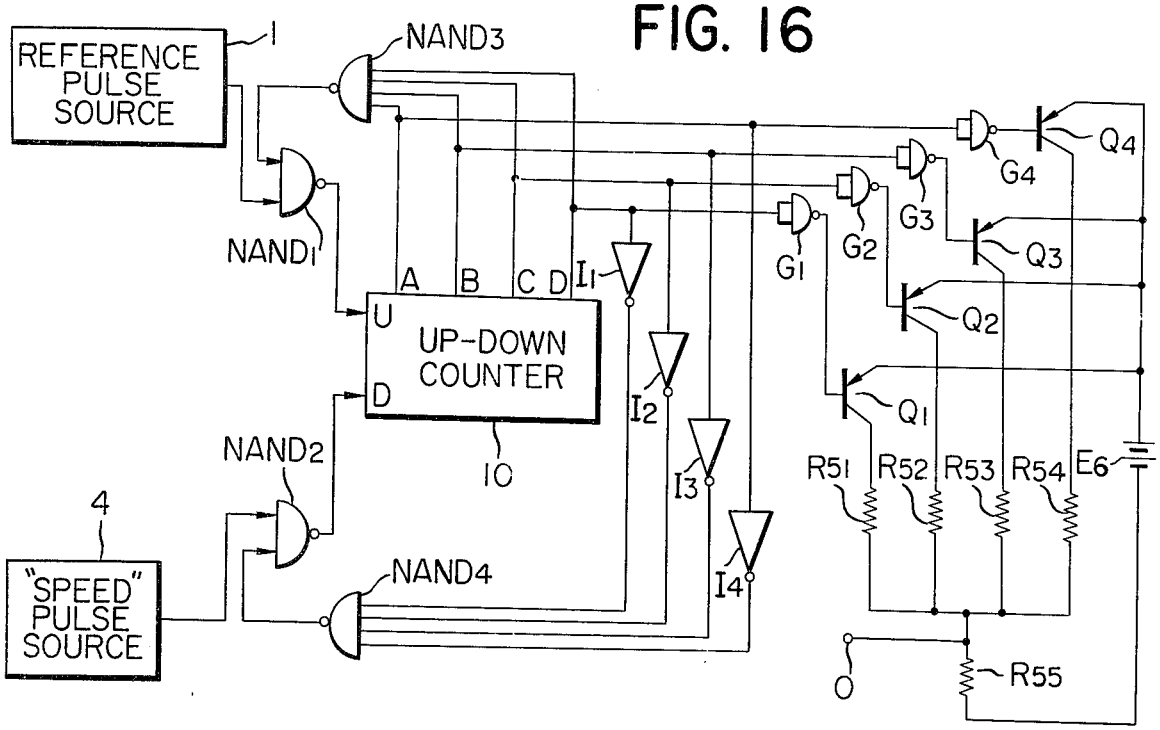
FIG. 16 is a circuit diagram of the main part of an electrical circuit applicable to the system of FIG. 15.

FIG. 16 is a block diagram of a forced synchronization circuit employing the up-down counter in accordance with this invention. In FIG. 16 showing the parts 10 and 11 in FIG. 15 in detail, 1 represents a reference pulse source, 4 a rate pulse source, 10 an up-down counter the same as used in FIG. 15, NAND1 to NAND4 NAND gates, I1 to I4 inverters G1 to G4 circuits composed of NAND gates and inverters, Q1 to Q4 switching transistors, R51 to R55 resistances, and E6 a power source. Now the operation of such systems as shown in FIGS. 15 and 16 will be explained.

In the drawing, a reference signal corresponding to the frequency of a preset reference speed is generated in the reference signal generator 1, and is transformed into a pulse. This pulse is applied to the set terminal S of the flip-flop circuit 7 through the rectifier 3. Speed of the motor is detected by means of the motor speed detector 4 (such as a tacho-generator), and is transformed into a pulse. This pulse is applied to the reset terminal R of the flip-flop circuit 7 through the rectifier 6. A rectangular wave signal is produced from the output of the flip-flop circuit 7 due to a phase difference between such input pulses. During the running of the motor in synchronization with the reference speed the pulse width of output from 7 is not changed with the result of no variation in the speed of the DC motor. When motor speed varies due to some reason, the frequency of output from the motor speed detector 4 is changed, and consequently the frequency of the rate pulse applied to the terminal R of the flip-flop circuit is changed. Thus the pulse width of a rectangular wave output signal varies, and speed of the DC motor driven therewith is changed so that synchronous revolutions may be restored.

In the above synchronous operation, proper synchronous revolutions may occur only when the frequency of the rate pulse becomes equal to that of the reference pulse. However, faulty synchronous operation may occur when its frequency becomes any of frequencies which are n times or 1/n the frequency of the reference pulse, that is, any of higher or lower harmonics thereof. In accordance with this invention a device to be described below is added for prevention of such erroneous synchronous revolutions. In other words, output signals from the reference signal generator 1 and the motor speed detector 4 are supplied to the up and down terminals U and D to be counted. Now assuming that the DC motor is running in harmony with the fundamental frequency of the reference pulse, two input signals may be applied alternately to 10, and thus output from 10 is kept constant and unchanged. Accordingly output from the D-A converter is not changed without affecting the function of the flip-flop circuit 7. On the other hand, if the DC motor is running in synchronization with any of higher or lower harmonics of the reference pulse frequency, input signals may not appear alternately at the terminal U, but either of them may be supplied successively. In other words, in case of synchronization with any of higher harmonics, down pulses are supplied successively from 4, while in case of synchronization with any of lower harmonics, up counting pulses are applied likewise. As a result, output from the counter 10 is changed to the (+) or (−) side. This output is converted into analog voltage by means of the D-A converter 11 to and is applied to the terminal S or R of the flip-flop circuit 7. Thus the function of the flip-flop circuit is controlled to decrease or increase revolutions until speed synchronized with the fundamental frequency is restored. In accordance with this invention such faulty synchronous operation can be avoided thanks to the forced synchronization circuit added to the system, as described above. FIG. 16 is a block diagram showing one embodiment of the foregoing forced synchronization circuit, in which the reference pulse from the reference pulse source 1 is applied to the up terminal U of up- down counter 10 through the NAND gate NAND1, while a speed pulse from the speed pulse source 4 is applied to the down terminal D of 10 through the NAND gate NAND2. When such two input signals are applied alternately to the counter, output may be produced from one of the output terminals A to D. This output operates one of switching transistors Q1 to Q4 through circuits G1 to G4, and current may flow through voltage dividers composed of resistance R51 to R54 and R55 from the power source E6. Voltage is produced at the output terminal 0, which is a dividing point NAND3 and NAND4 are operated when receiving all signals from the output terminals of the counter, and produce "not" signals so as to turn the NAND gate 1 or 2 off at the time of full count and interrupt the supply of the reference pulse and the speed pulse to the counter. I1 to I4 represent inverters. Output voltage determined by the parallel compound value of the resistances R51 to R54 and the resistance R55 is applied to the terminals S and R of the flip-flop circuit 7 via the rectifiers 3 and 6 in FIG. 15 for forced synchronous drive.

FIG. 17 is a block diagram showing another embodiment of the synchronous operation control system of this invention. In the drawing, like symbols represent like parts or components in FIG. 15. Numerals 12, 14 and 16 represent detectors for detecting individual output signals from an up-down counter 10, 13 and 15 gates. The operation of the system is almost the same as that of FIG. 15, where output signals from the counter 10 are detected by detectors 12, 14 and 16. When this output is zero, the detector 16 is operated so as to turn the gates 13 and 15 off and interrupt application of a signal from the forced synchronization circuit to the input terminals S and R of the flip-flop circuit 7. This condition means normal synchronous operation. With output +1 the gate 13 is turned on, and a signal is applied to the terminal S of the flip-flop circuit 7, while with output −1 the gate 15 is turned on, and a signal is supplied to the terminal R of the same circuit. In other words, normal synchronization is achieved with three outputs (1, 1, 0), higher harmonic synchronization with (1, 0, 0), and lower harmonic synchronization with (1, 1, 0), and output from the flip-flop circuit is supplied to the DC motor so as to restore its normal synchronization all the time.

Figure 18:
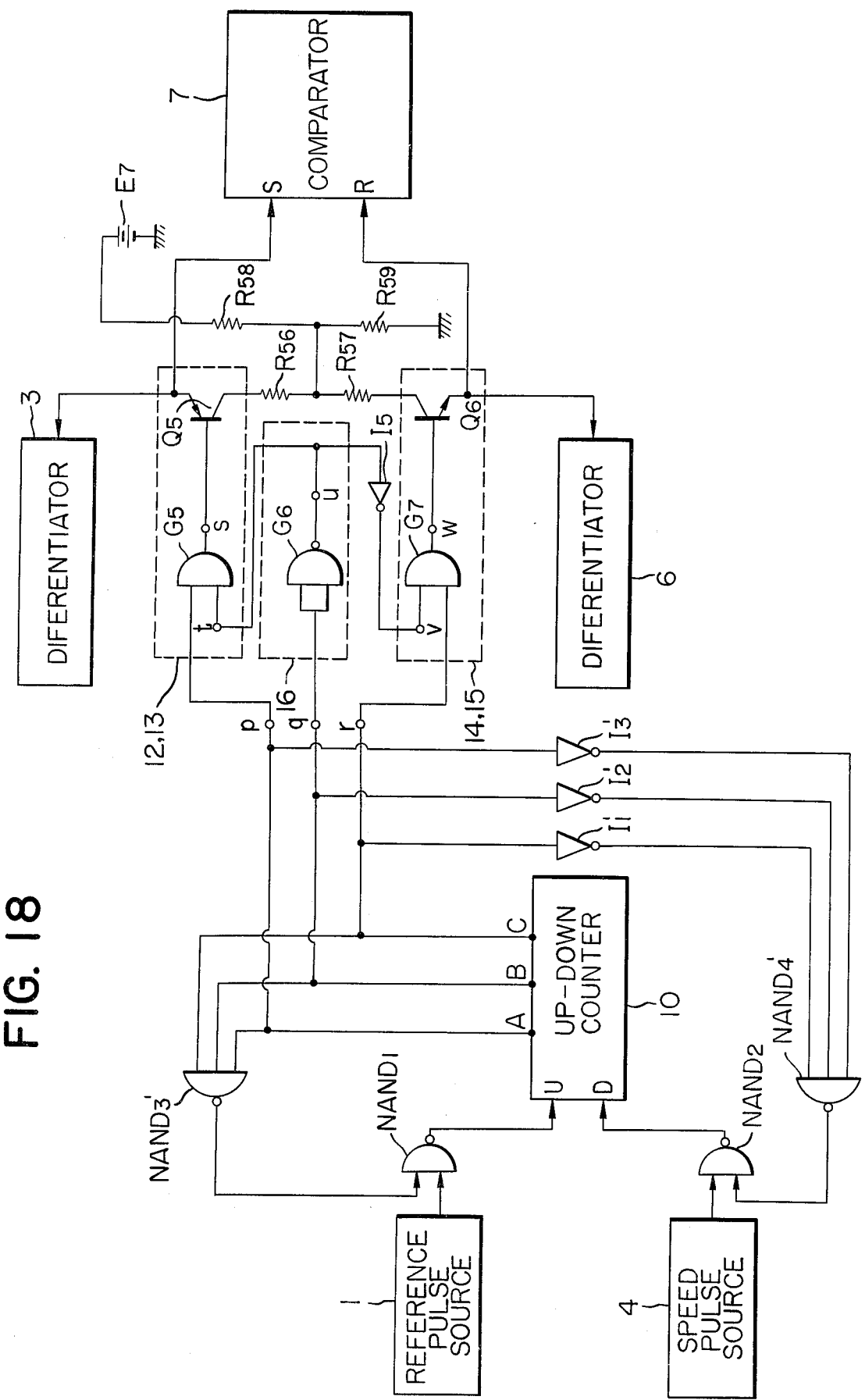
FIG. 18 is a circuit diagram of the main part of an electrical circuit appplicable to the system of FIG. 17.

FIG. 18 shows circuits of the parts 10 and 12 to 15 in FIG. 17 for example. In the drawing, like symbols represent like parts or components in FIG. 16 for brevity of explanation. A NAND gate NAND3' for logic function is provided, which is connected directly to the output terminals A, B and C of the up-down counter 10, and a NAND gate NAND4' for logic function is provided, which is connected to the same terminals through inverters. The output terminals of the counter 10 are also connected to AND gates G5, G6 and G7, and output terminals of G5 and G7 are connected to transistors Q5 and Q6, which emitters are coupled to the set and reset terminals S and R of the flip-flop circuit 7 respectively. E7 represents a power source.

Now the operation of the circuits will be explained briefly. When a pulse signal is applied from the reference pulse source 1 to one of the input terminals of NAND1, without any signal to other input terminal thereof, an output signal is produced and is supplied to the up terminal U of the counter 10. In this manner, input signals are applied successively to the up terminal at the time of operating the DC motor at lower speed, and output signals appear successively at the output terminals A, B and C of the counter 10 so as to increase speed of the motor in a similar way as described above. As motor speed increases, a pulse signal will be supplied soon from the speed pulse source 4 to one of the input terminals of NAND2. Output produced from NAND2 at the time of no signal to other input terminal is applied to the down terminal D of the counter 10 so as to make it count down by one. As motor speed approaches a predetermined synchronous speed, periods of input signal from the two sources 1 and 4 become equal, and signals are applied alternately to the up and down terminals U and D of the counter 10. Thus, output signals from the terminals A, B and C becoming constant may keep the DC motor running at synchronized speed. The circuits are so arranged that output signals in such a steady state are produced from the terminal B all the time. With output produced at B, terminals p, q and r of input and output terminals p to w of these gates in the drawing has signal levels given below in binary notation.

$p=1, q=1, r=0$.

As $u=l=0$, $s=0$, and the transistor Q5 is in its off state. Consequently no input signal is supplied to the set terminal S of the flip-flop circuit 7. When $u=0$, $v=1$, and hence $w=0$. Then, the transistor Q6 is in its off state too, and no reset input signal is supplied to the circuit 7.

When the counter 10 continues to count only up to the time when output is produced from the terminal A, $p=1$, $q=r=0$. As $u=t=1$, $s=1$, and the transistor Q5 is brought into in its on state and supplies set input signals to the flip-flop circuit 7. On the other hand, when $u=1$, $v=0$, and hence $w=0$. Thus the transistor Q6 is kept in its off state without applying any reset input signal to the circuit 7.

When the counter 10 continues to count until output is produced from the terminal C, $p=q=r=1$. As $u=t=0$, $s=0$, and the transistor Q5 is brought into in its off state. Thus no set signal is produced at the input S of the flip-flop circuit 7. On the other hand, as $v=1$, $w=1$, and the transistor Q6 is turned on. Consequently a reset signal is applied to the terminal R of the circuit 7.

As explained with reference to FIG. 17, output is produced from the terminal B all the time during synchronous revolutions of the DC motor, while output is produced only from the terminal A under the condition of running at any lower speed so that output may be delivered to the input terminal S of the flip-flop circuit 7 for increasing the motor speed. In case of higher speed, output produced from the terminal C of the counter 10 is added, and a signal is supplied at once to the reset terminal R of the flip-flop circuit 7 for decreasing the motor speed. In this manner the DC motor can be kept running forcibly at synchronous speed by means of this up-down counter 10.

As described above, the synchronous drive system of this invention has means for preventing faulty synchronous operation from occurring with output from the motor speed detector synchronized with any of higher or lower harmonics of the reference speed frequency, whereby extremely stable synchronous drive can be accomplished. This contributes greatly to improvement in accuracy of motor speed control.

Figure 19:
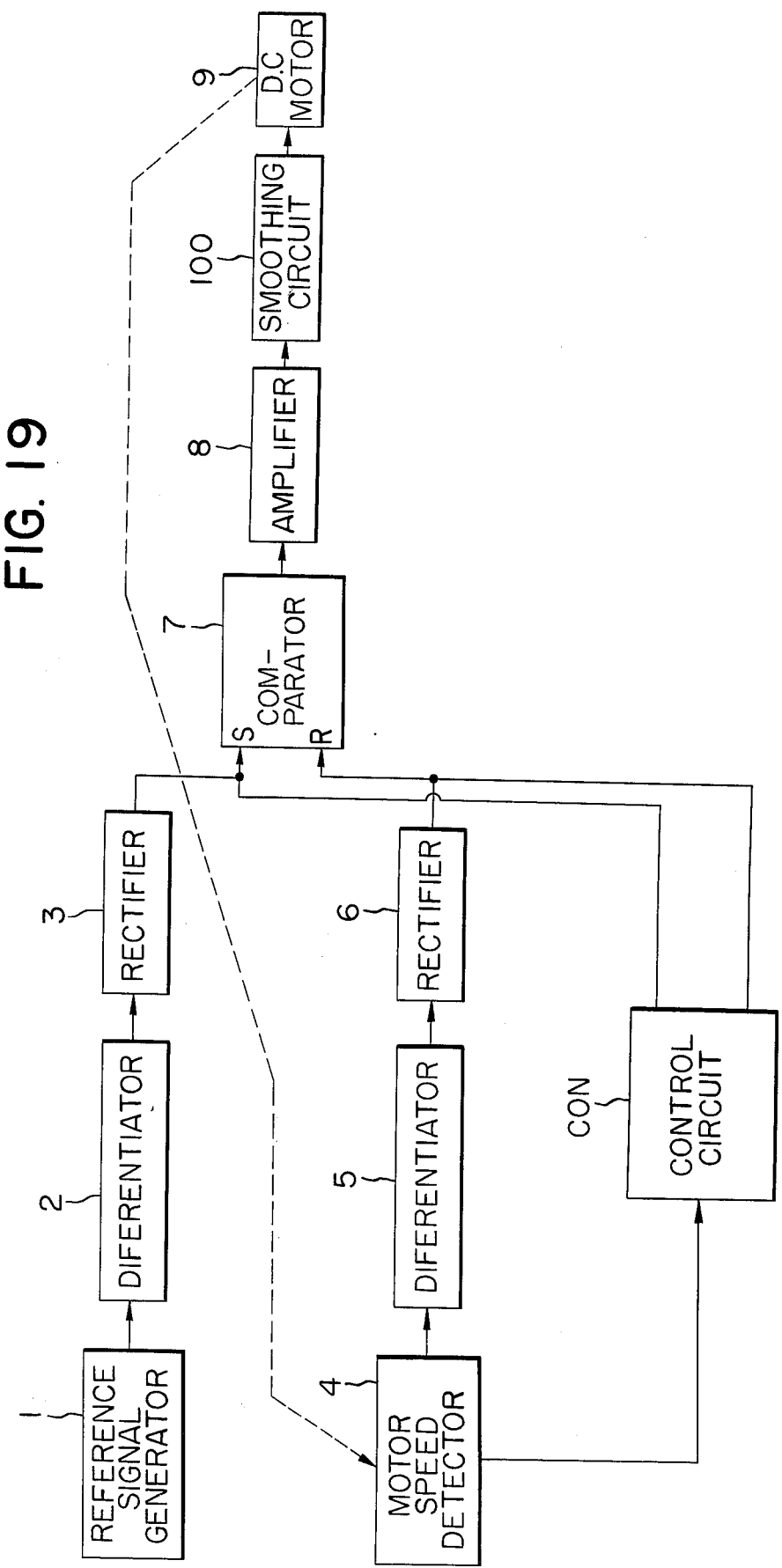
FIG. 19 is a block diagram showing a fifth embodiment of this invention.

FIG. 19 is a block diagram showing a fifth embodiment of this invention, in which like symbols represent like parts or components in the foregoing embodiments for brevity of explanation.

A feature of the arrangement in this embodiment is a smoothing circuit 100 inserted between an amplifier 8 and a DC motor 9 as shown in the drawing. This smoothing circuit will be explained later in detail with reference to FIG. 20. In conventional systems having no smoothing circuit, the DC motor cannot exhibit its essential performance (designed for DC use) to full satisfaction due to higher harmonic components of pulse signals received at the DC motor as a final load, such pulse signals being supplied as input and output signals to the amplifier 8, and furthermore, torque is produced unevenly like pulse waveforms. The reason for insertion of the smoothing circuit is to solve such a problem. For eliminating this disadvantage is required smoothing final pulse voltage applied to the DC motor into DC voltage. To do this, a low pass filter or a D-A converter may be employed as the smoothing circuit, which converts rectangular wave signals into DC pulsating signals. This smoothing circuit may be provided between the flip-flop circuit 7 and the amplifier 8.

Figure 20A:
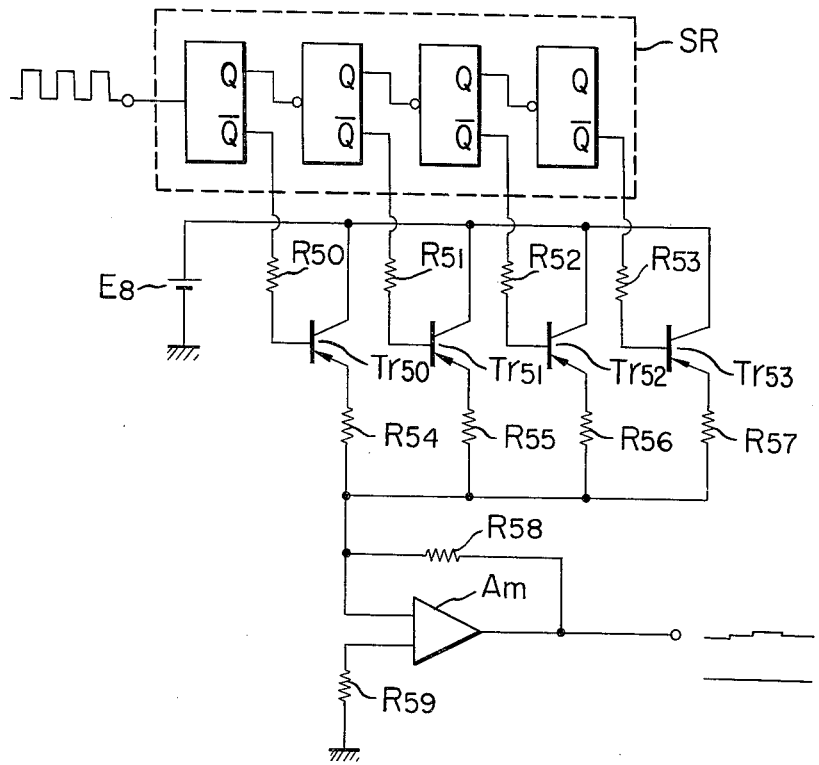
FIGS. 20A, 20B and 20C are circuit diagrams showing examples of a smoothing circuit, which may be used in the system of FIG. 19.

FIG. 20A shows a D-A converter for producing analog signals with pulse signals applied to the input. This converter may be such as is well known, and the converter shown in the drawing consists of shift register SR composed of four flip-flop circuits, voltage dividing resistances R50 to R57, amplifier Am, feedback resistance R58 therefore, bias resistance R59 for said amplifier Am, and transistors Tr50 to Tr53. E8 represents a power source. The operation will be readily understood by those skilled in the art, and explanation is omitted here.

Figure 20B:
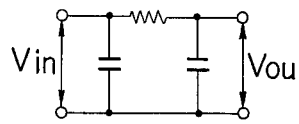

FIG. 20B shows a low pass filter conventionally known, in which analog signals are produced as output signals Vou with pulse input signals Vin supplied between the input terminals.

Figure 20C:
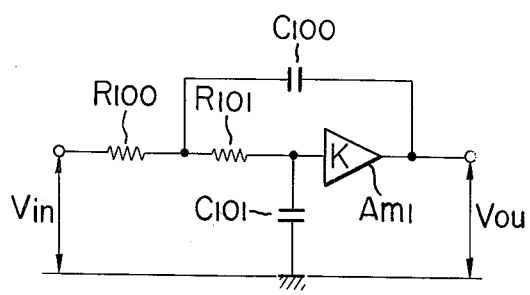

FIG. 20C shows another example of a low pass filter consisting of resistances R100 and R101, capacitors C100 and C101, and amplifier Am1, in which frequencies below the cutoff frequency of said filter of a pulse input signal Vin may pass therethrough and those above the cutoff frequency may not pass through it. Thus the signal is transformed into a step-like DC signal.

In this embodiment, faulty synchronous operation can be effectively eliminated, which may otherwise occur when pulse signals are supplied for driving the DC motor, as already described, and proper synchronous revolutions can be realized in response to the reference signal of a specific frequency.

I claim:

1. A DC motor and control system therefor comprising, in combination:
   a. a DC motor;
   b. motor-speed detecting means for detecting the rotational speed of said DC motor and generating an electrical signal having a frequency corresponding to the instantaneously changing rotational speed of said DC motor, said motor-speed detecting means being associatively arranged with said DC motor;
   c. means for generating a reference signal having a predetermined frequency in accordance with which said DC motor rotates at a predetermined constant speed;
   d. means for comparing said electrical signal and said reference signal to supply to said DC motor a potential corresponding to the phase difference of said signals; and
   e. control means inserted between said motor-speed detecting means and said comparing means to form an auxiliary feed back loop, said control means being arranged to produce a control signal operative to disable said comparing means only when the electrical signal frequency exceeds said reference signal by a predetermined amount and to interrupt said supply of the potential corresponding to the phase difference of said signals to said DC motor.

2. A DC motor and control system therefor according to claim 1 wherein said control means comprises:
   electrical filter means connected to said motor-speed detecting means for discriminating the frequency of said electrical signal from two groups of frequencies, one group including the frequency which exceeds that of said reference signal and is proximate thereto, and other group including the frequency appearing below that of said reference signal and being proximate thereto; and
   means for selectively enabling and disabling said comparing means from operating according to the output signals from said electrical filter means.

3. A DC motor and control system therefor according to claim 1, in which said control means comprises:
   filtering means for passing a part of the electrical signal from said motor-speed detecting means by discriminating the frequency thereof, and
   means for generating a signal for controlling said comparing means in response to the signal passed through said filtering means.

4. A DC motor and control system therefor according to claim 1, in which said control means comprises:
   low and high pass filters connected to said motor-speed detecting means and being arranged to produce a signal operative to control said comparing means.

5. A DC motor and control system therefor according to claim 1, in which said control means comprises:
   a counter connected to said motor-speed detecting means and said reference signal generating means, said counter being operative to count output signals from both said means and to control said comparing means in response to said output signals.

6. A DC motor and control system therefor according to claim 1, in which said control means comprises:
   an up-down counter arranged to count down in response to the output signal from said motor-speed detecting means and to count up in response to output signals from said reference signal generating means so that enabling and disabling of said comparing means is controlled in accordance with the number of counts thus made.

7. A DC motor control system comprising:
   a. a DC motor;
   b. means for generating a signal having a frequency corresponding to the speed of said DC motor;
   c. means for generating a reference signal having a predetermined frequency in accordance with which said DC motor rotates at a predetermined constant speed;
   d. signal comparing means for permitting current to flow to said DC motor in response to said reference signal and for interrupting said current flow in response to said DC motor speed signal, said signal comparing means being inserted between said signal generating means and said DC motor to form a first feed-back loop for motor speed control; and
   e. means for detecting the frequency of said DC motor speed signal and comparing the detected frequency with the frequency of said reference signal to produce a first control signal for disabling said comparing means only when said detected frequency exceeds said reference signal frequency and a second control signal for enabling said comparing means only when said detected frequency appears below said reference signal frequency, said frequency detecting and comparing means being inserted between said signal generating means and said comparing means to form a second feedback loop.

8. A DC motor control system according to claim 7, wherein said comparing means comprises:
   a flip-flop circuit having a reset terminal to which said signal corresponding to the motor speed is applied, a set terminal to which said reference signal is applied, and output terminals from which its output signals are applied to said DC motor.

9. A DC motor control system according to claim 7, further comprising a first frequency divider arranged to modify the frequency of said motor speed signal.

10. A DC motor control system according to claim 7, further comprising a second frequency divider arranged to modify the frequency of said reference signal so as to rotate said DC motor at different speeds according to the modified frequency of said reference signal.

11. A DC motor control system according to claim 10, wherein said reference signal generating means includes means for modifying the reference frequency of said second feed-back loop cooperatively with said second frequency divider.

12. A DC motor control system according to claim 7, wherein said frequency detecting and comparing means includes a high pass filter for developing said first control signal and a low pass filter for developing said second control signal, both said filters having a cut-off frequency in the vicinity of said reference frequency.

13. A DC motor control system comprising:
   a. a DC motor;
   b. means for generating a signal having a frequency corresponding to the speed of said DC motor;
   c. means for generating a reference signal of a fixed period for operating said DC motor at a predetermined reference speed;
   d. comparing means having applied thereto said signal having a frequency corresponding to the speed of said DC motor and said reference signal and being operative to supply a rectangular wave signal to said DC motor corresponding to the phase difference between said two signals;
   e. frequency detecting means connected to said motor speed signal generating means for detecting predetermined frequencies from said signal, said frequency detecting means having low and high pass filters with their cutoff frequency corresponding to said reference speed; and
   f. means for converting output signals from said two filters into respective step signals, said converting means being connected to said comparing means so that whenever the speed of said DC motor is shifting from a predetermined reference speed or coming out of synchronization, synchronous operation may be immediately restored.

14. A DC motor control system comprising:
   a. a DC motor;
   b. means for generating a signal having a frequency corresponding to the speed of said DC motor;
   c. means for generating a reference signal of a fixed period for operating said DC motor at a predetermined reference speed;
   d. comparing means having applied thereto said signal having a frequency corresponding to the speed of said DC motor and said reference signal and being operative to supply a rectangular wave signal to said DC motor corresponding to the phase difference between said two signals;
   e. control means inserted between said signal generating means and said comparing means to form an auxiliary feedback loop for controlling the motor speed, said control means being arranged to produce a first control signal for disabling said comparing means only when the electrical signal from said motor speed signal generating means exceeds said reference signal in frequency and to interrupt the supply of potential to said DC motor corresponding to the phase difference of said signals;
   f. means for detecting the disabled state of said comparing means; and
   g. means for damping said DC motor at the time of said disabled state.

15. A DC motor control system according to claim 14, in which said synchronous drive control means includes;
   filters having a frequency corresponding to said reference speed as their cutoff frequency.

16. A DC motor control system according to claim 14, in which said detecting means includes;
   a monostable multivibrator operative in response to said signal having a frequency corresponding to speed of said DC motor.

17. A DC motor control system according to claim 14, in which said damping means includes;
   a circuit for detecting reverse power produced in said DC motor at the time of interruption of driving current thereto, and a circuit for supplying damping current to said DC motor with the output from said circuit.

18. A DC motor control system comprising:
   a. a DC motor;
   b. means for generating a signal having a frequency corresponding to speed of said DC motor;

c. means for generating a reference signal of fixed period for operating said DC motor at a predetermined reference speed;

d. comparing means having applied thereto said signal having a frequency corresponding to the speed of said DC motor and said reference signal and being operative to supply a rectangular wave signal to said DC motor corresponding to the phase difference between said two signals;

e. control means inserted between said signal generating means and said comparing means to form an auxiliary feedback loop for controlling the motor speed, said control means being arranged to produce a first control signal for disabling said comparing means only when the electrical signal from said motor speed signal generating means exceeds said reference signal in frequency and to interrupt the supply of potential to said DC motor corresponding to the phase difference of said signals; and f. means inserted between said comparing means and said DC motor for smoothing the rectangular wave output signals from said comparing means.

19. A DC motor control system according to claim 18, wherein said smoothing means includes a low pass filter.

* * * * *

UNITED STATES PATENT OFFICE
CERTIFICATE OF CORRECTION

Patent No. 3,936,710           Dated    February 3, 1976

Inventor(s) KINJI TANIKOSHI

It is certified that error appears in the above-identified patent and that said Letters Patent are hereby corrected as shown below:

Column 5, line 14, change "rest" to --reset--.

Column 6, line 13, insert --a-- before "tacho-generator".

Column 7, line 63, insert --power-- before "circuit".

Column 11, line 35, change "device." to --device in the synchronous drive system of this invention (Fig. 11), showing one embodiment of the device.--;

line 47, change "rest" to --reset--.

Column 16, line 43, change "u=1=0," to --u=t=0,--.

Signed and Sealed this twenty-second Day of June 1976

[SEAL]

Attest:

RUTH C. MASON
*Attesting Officer*

C. MARSHALL DANN
*Commissioner of Patents and Trademarks*